(12) United States Patent
Gupta et al.

(10) Patent No.: US 10,904,084 B2
(45) Date of Patent: Jan. 26, 2021

(54) METHODS AND APPARATUS FOR RECONFIGURING HOSTS IN PROVIDER NETWORK ENVIRONMENTS

(71) Applicant: Amazon Technologies, Inc., Seattle, WA (US)

(72) Inventors: Diwakar Gupta, Seattle, WA (US); Duane Todd Carson, Kirkland, WA (US); Jonathan Welter Mullen, Seattle, WA (US); Srinivasan Jagannathan, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/530,879

(22) Filed: Aug. 2, 2019

(65) Prior Publication Data

US 2019/0356547 A1     Nov. 21, 2019

Related U.S. Application Data

(63) Continuation of application No. 15/472,097, filed on Mar. 28, 2017, now Pat. No. 10,374,880.

(51) Int. Cl.
*G06F 15/177* (2006.01)
*H04L 12/24* (2006.01)
*H04L 12/26* (2006.01)

(52) U.S. Cl.
CPC ...... *H04L 41/0813* (2013.01); *H04L 41/0816* (2013.01); *H04L 41/0889* (2013.01); *H04L 41/14* (2013.01); *H04L 43/0817* (2013.01)

(58) Field of Classification Search
CPC ............. H04L 41/0813; H04L 41/0816; H04L 41/0889; H04L 41/14; H04L 43/0817

(Continued)

(56) References Cited

U.S. PATENT DOCUMENTS 10,374,880 B1   8/2019 Gupta et al.
2008/0244579 A1  10/2008 Muller
(Continued)

OTHER PUBLICATIONS

Chen, Wei, et al. "A two-level virtual machine self-reconfiguration mechanism for the cloud computing platforms." 2012 9th International Conference on Ubiquitous Intelligence and Computing and 9th International Conference on Autonomic and Trusted Computing. IEEE, 2012, pp. 1-8.

(Continued)

*Primary Examiner* — Wing F Chan
*Assistant Examiner* — Joseph R Maniwang
(74) *Attorney, Agent, or Firm* — Robert C. Kowert; Kowert, Hood, Munyon, Rankin & Goetzel, P.C.

(57) ABSTRACT

Methods and apparatus for reconfiguring hosts in provider network environments in which hosts are evaluated to determine if steps of a full rebuild can be skipped. The hosts may implement slots of different types for virtual machines (VMs). Upon detecting that slots of a particular type are needed, a host that implements slots of another type may be selected for reconfiguration. The host may be evaluated to determine if one or more steps of a full rebuild can be skipped. The host may then be reconfigured to implement slots of the target type according to results of the evaluation. In at least some reconfigurations, at least one step of a full rebuild procedure is not performed for the respective host. Results of previous reconfigurations may be fed back into the evaluation process and used as one of the criteria for determining if steps can be skipped.

20 Claims, 23 Drawing Sheets

(58) Field of Classification Search
USPC .......................................................... 709/221
See application file for complete search history.

(56) References Cited

U.S. PATENT DOCUMENTS

2011/0173637 A1 7/2011 Brandwine et al.
2014/0280961 A1 9/2014 Martinez et al.

OTHER PUBLICATIONS

Verma, Akshat, et al. "Cosmig: Modeling the impact of reconfiguration in a cloud." 2011 IEEE 19th Annual International Symposium on Modelling, Analysis, and Simulation of Computer and Telecommunication Systems. IEEE, 2011, pp. 1-9.

METHODS AND APPARATUS FOR RECONFIGURING HOSTS IN PROVIDER NETWORK ENVIRONMENTS

This application is a continuation of U.S. patent application Ser. No. 15/472,097, filed Mar. 28, 2017, which is hereby incorporated by reference herein in its entirety.

BACKGROUND

Many companies and other organizations operate computer networks that interconnect numerous computer systems to support their operations, such as with the computer systems being co-located (e.g., as part of a local network) or instead located in multiple distinct geographical locations (e.g., connected via one or more private or public intermediate networks). For example, data centers housing significant numbers of interconnected computer systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Figure 1:
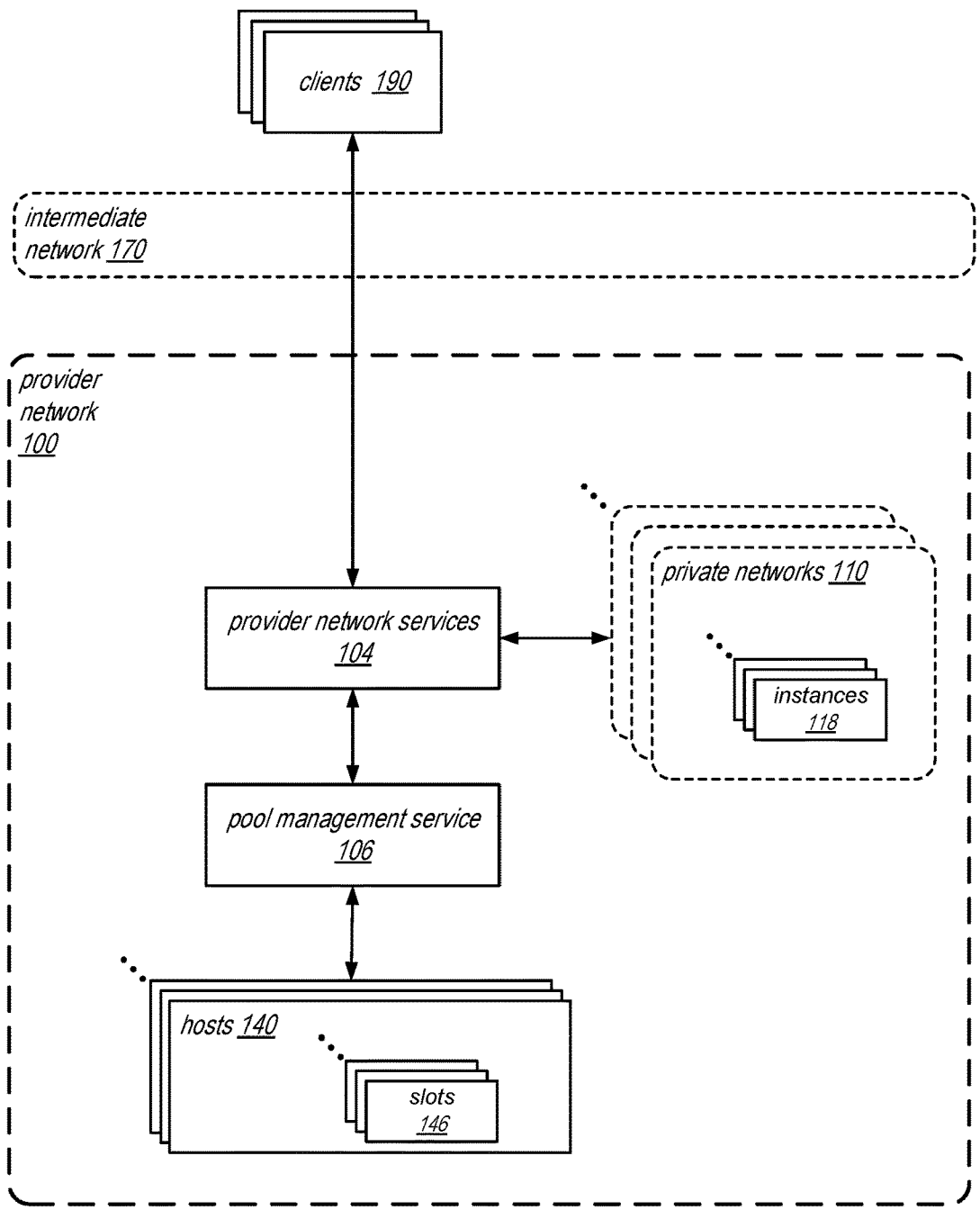
FIG. 1 illustrates a provider network environment, according to some embodiments.
Figure 2A:
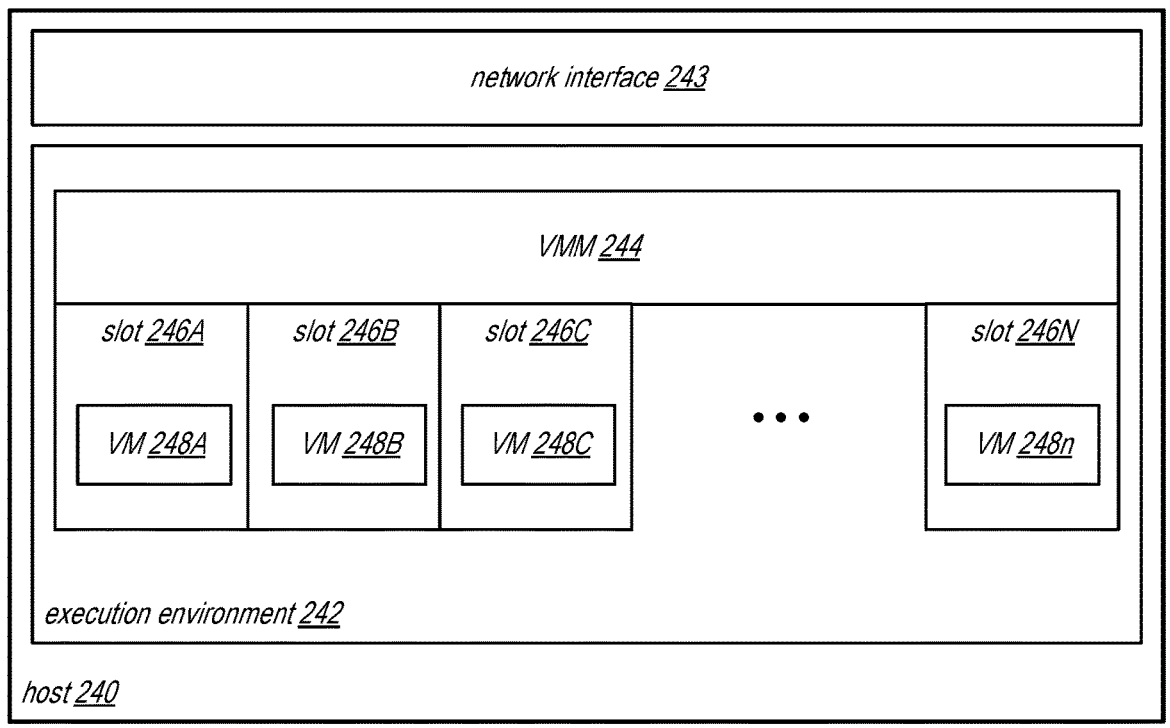
FIG. 2A through 2C illustrate a host device that provides slots for executing virtual machines (VMs) in a provider network environment, according to some embodiments.
Figure 2B:
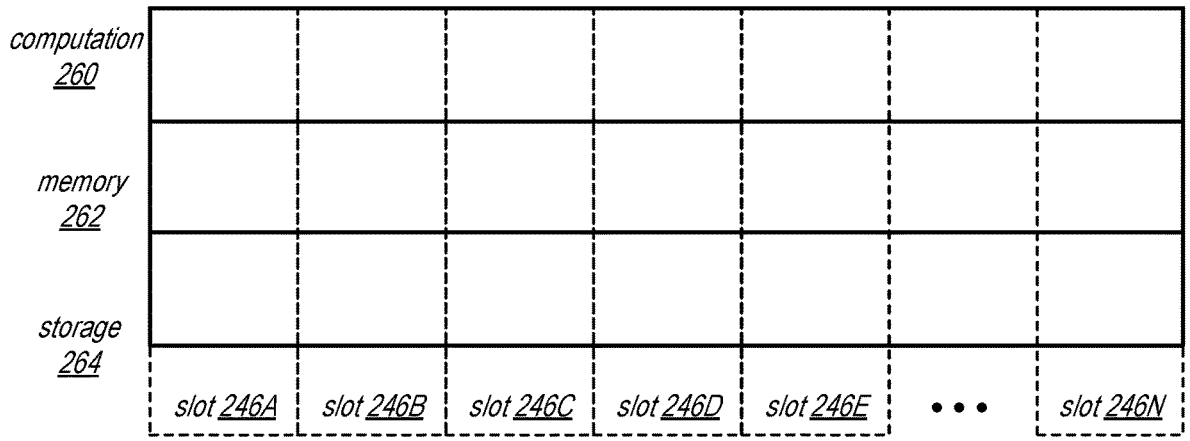
Figure 2C:
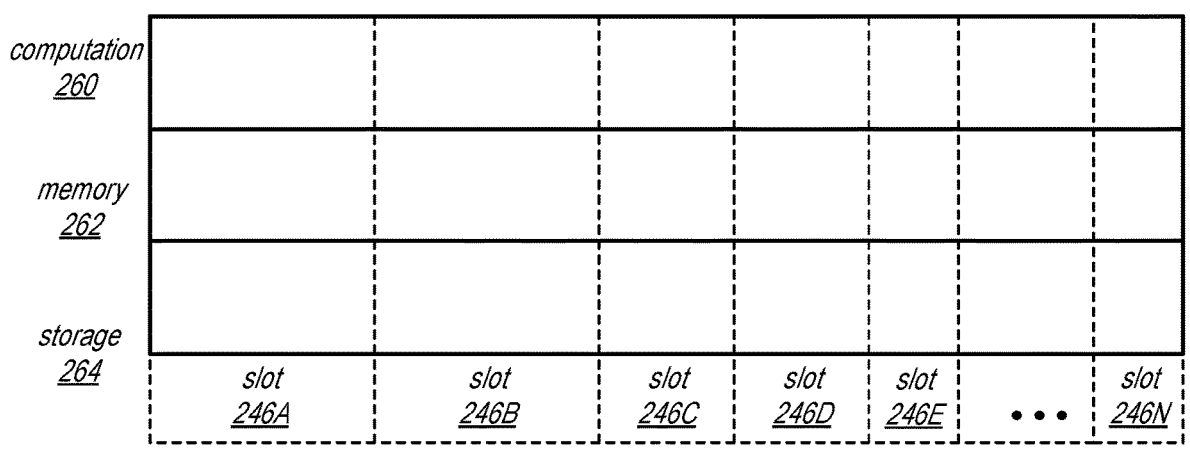

Various embodiments of methods and apparatus for reconfiguring host devices in provider network environments are described. FIG. 1 illustrates a provider network environment, according to some embodiments. In at least some embodiments of a provider network 100, at least some of the resources provided to clients 190 via the provider network 100 may be virtualized computing resources (also referred to as virtual machines (VMs)) executed on multi-tenant hardware that is shared with other client(s) 190 and/or on hardware dedicated to a particular client 190. A host device 140 (referred to herein as a host) may be a computing device on the provider network 100 that includes hardware virtualization technology (hardware and software) that provides multiple (N) slots 146 in which virtual machine (VM) instances may be installed. Each slot 146 on a host 140 may be provisioned with a given amount of resources (memory space, storage (e.g., disk) space, computation (e.g., CPU) resources etc.) on the respective host 140. FIGS. 2A-2C illustrate an example host 140 in more detail.

FIG. 2A illustrates a host device that provides slots for executing virtual machines (VMs) in a provider network environment, according to some embodiments. VMs 248A-

248n may be executed in slots 246A-246N on a host 240 according to hardware virtualization technology that enables multiple operating systems to run concurrently on the host device 240. While FIG. 2A shows a VM 248 executing in each slot, one or more, or all, of the slots 246 on a given host 240 may be empty (i.e., not provisioned with a VM 248); an empty slot 246 may be referred to herein as an available slot. As illustrated in FIGS. 2B and 2C, each slot 246 on host 240 may be provisioned with a given amount of resources (memory 262 space, storage 264 (e.g., disk) space, computation 260 (e.g., processor) resources etc.) on the host 240. In some embodiments, as illustrated in FIG. 2B, each of the N slots in host 240 may be provisioned with the same amount of resources of the host 240. In some embodiments, however, different slots 246 may be provisioned with different amounts of resources of the host 240, as illustrated in FIG. 2C.

A hypervisor, or virtual machine monitor (VMM) 244, on the host 240 presents the VMs 248A-248n on the respective host 240 with a virtual platform and monitors the execution of the VMs 248A-248n on the host 240. Each VM 248 on a host 240 may be provisioned with a given amount of resources (memory space, storage (e.g., disk) space, computation (e.g., CPU) resources, etc.) as provided by the respective slot 246 on the respective host 240. Each VM 248 may be provided with one or more IP addresses; the VMM 240 on a respective host 240 may be aware of the IP addresses of the VMs 248A-248n on the host 240. The VMM 244 and VMs 248A-248n may be executed by components of the host 240, for example processor(s) and memory of the host 240, represented in FIG. 2A as an execution environment 242. In some embodiments, a host 240 may also include a network interface 243 that processes network traffic (e.g., packet flows) between VMs 248A-248n on the host 240 and the provider network.

Figure 3:
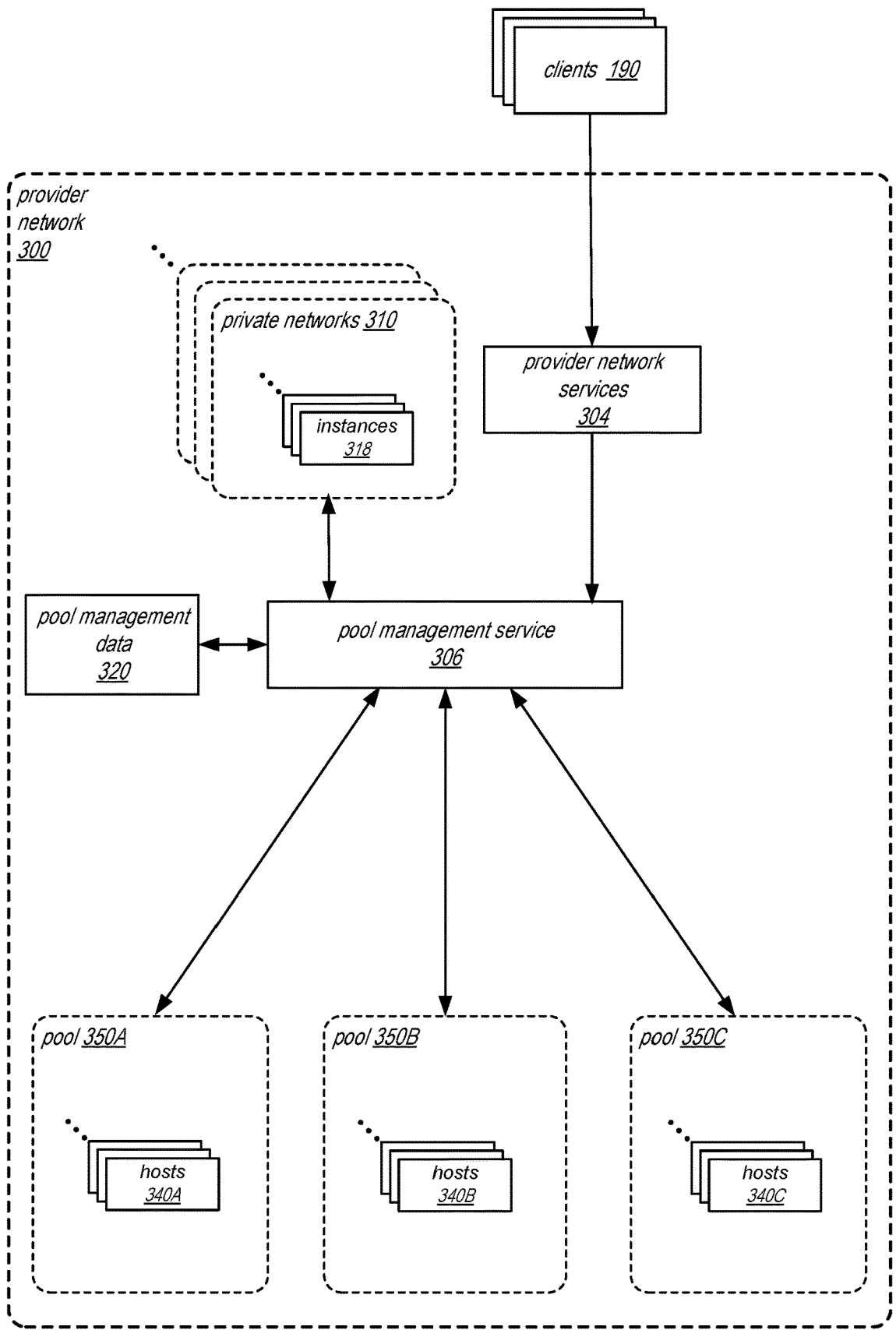
FIG. 3 illustrates a host pool management service in a provider network environment, according to some embodiments.
Figure 19:
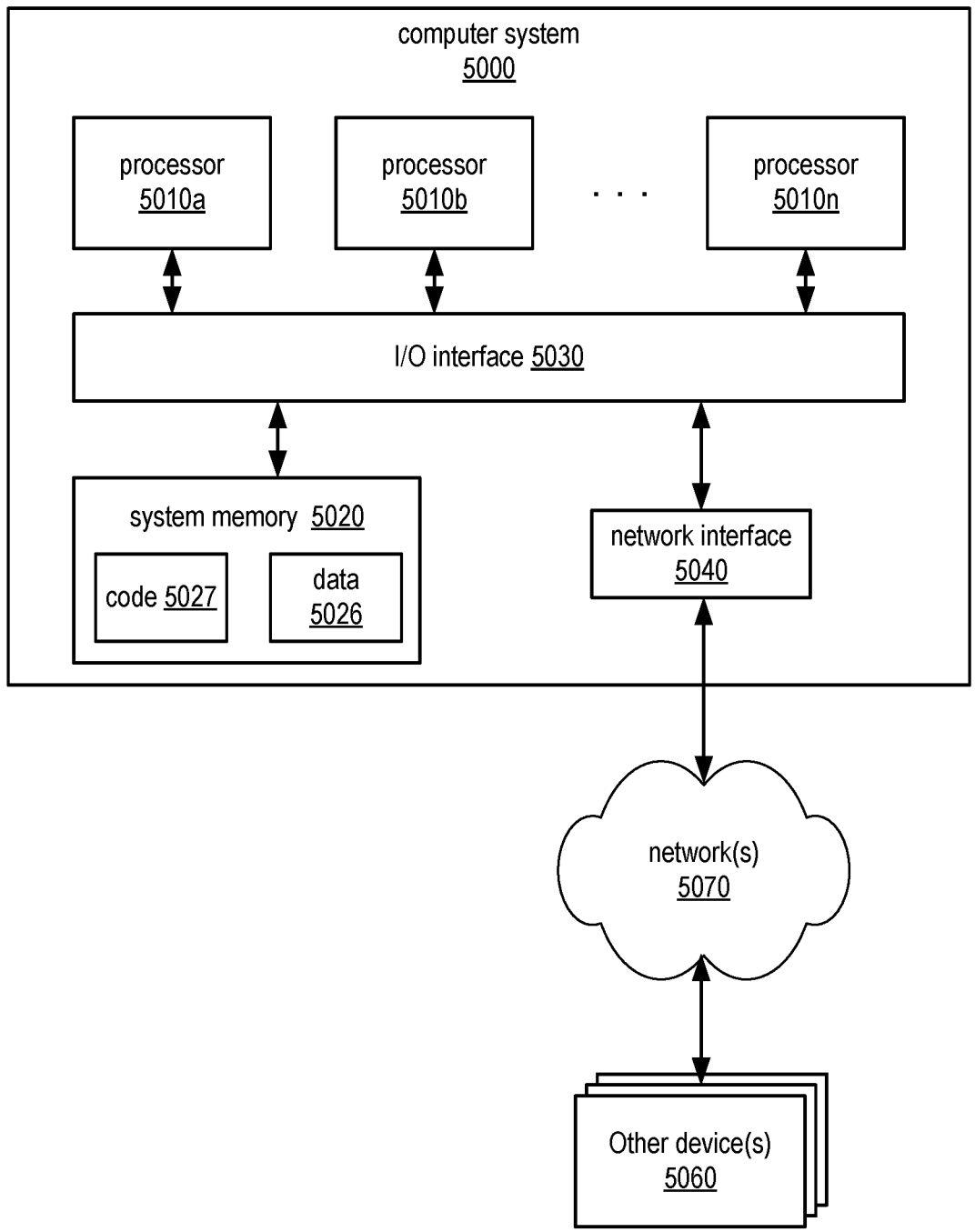
FIG. 19 is a block diagram illustrating an example computer system that may be used in some embodiments.

Referring again to FIG. 1, the provider network 100 may support two or more different types of slots 146, for example small, medium, and large slots that are provisioned with different levels of resources (memory space, storage space, etc.) on respective hosts 140. In some embodiments, each host 140's slots 146 are configured with homogeneous slots 146, i.e. slots 146 of the same type, with different ones of the hosts 140 configured to provide slots 146 of the different types. In some embodiments, however, a host 140 may be configured with heterogeneous slots 146, e.g. slots of different sizes. The provider network 100 may maintain logical pools of hosts 140, with each pool including hosts 140 that implement one of the different types of slots 146. For example, there may be three pools, with one pool including hosts that implement small slots, another pool that includes hosts that implement medium slots, and a third pool that includes hosts that implement large slots. The provider network 100 may include a pool management service 106 implemented by a computer system comprising one or more computing devices on the provider network that manages the pools of hosts with available slots 146. FIG. 3 shows an example provider network that includes logical pools of hosts managed by a pool management service. FIG. 19 shows an example computer system.

The provider network 100 may provide one or more services 104 implemented by computer systems comprising one or more computing devices on the provider network that provide APIs via which clients 190 may request slots 146 of the different types for their respective provider network implementations, for example for their private networks 110 on the provider network 100, via an intermediate network 170 such as the Internet. Once a client 190 acquires a slot 146, a VM 148 may be installed in the slot 146 as a resource instance 118, or simply instance, in the client's private network 110 according to the client's requirements. When a provider network service 104 receives a request for a slot 146 of a particular type from a client 190 (or from some other requestor, such as another provider network service), the provider network service 104 may send a request for an available slot 146 of that type to the pool management service 106. The pool management service 106 locates an available slot 146 on a host 140 in the pool of hosts that provide slot 146 of that type and notifies the requesting service 104 identifying the available slot 146. A VM 148 as specified by the client may then be installed in the slot 146 and configured as a resource instance 118 in the client's private network 110.

Figure 5:
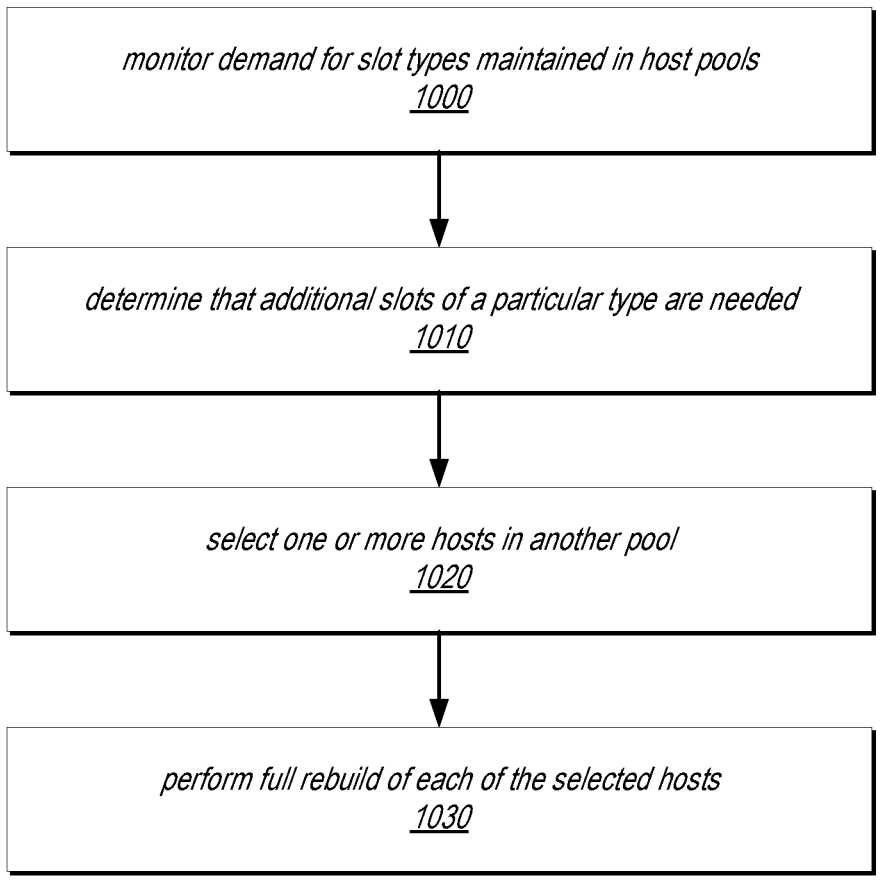
FIG. 5 is a high-level flowchart of a method for moving hosts from one pool to another pool in which full rebuilds are performed on the hosts that are moved, according to some embodiments.

The pool management service 106 may monitor demand on the different types (e.g., different sizes) of slots 146 maintained in the respective pools, as well as the number of available slots 146 provided by hosts 140 in the pools, and may move hosts 140 between pools if needed. Conventionally, to move a host from one pool to another pool, a full rebuild procedure is run on the host 140 to reconfigure the host 140 with slots 146 of the target type. FIG. 5 is a high-level flowchart of a method for moving hosts from one pool to another pool in which full rebuilds are performed on the hosts that are moved, according to some embodiments. As indicated at 1000, the pool management service may monitor demand for the slot types maintained in the host pools. As indicated at 1010, the pool management service may determine that additional slots of a particular type are needed. For example, if demand is high for slots of a certain type (e.g., small slots), or if the number of available slots of a certain type (e.g., small slots) is low (e.g., below a threshold), then the pool management service may decide to move hosts from another pool to the pool with high demand or low numbers of available slots. As indicated at 1020, the pool management service may select one or more hosts in a pool of hosts that provide slots of another type (e.g., large slots) to be moved to the pool of hosts that provide slots of the type (e.g., small slots) that is in demand or is running low. As indicated at 1030, a full rebuild procedure is run on the host to reconfigure the host with slots of the target type. An example full rebuild procedure is illustrated in FIG. 6.

Figure 6:
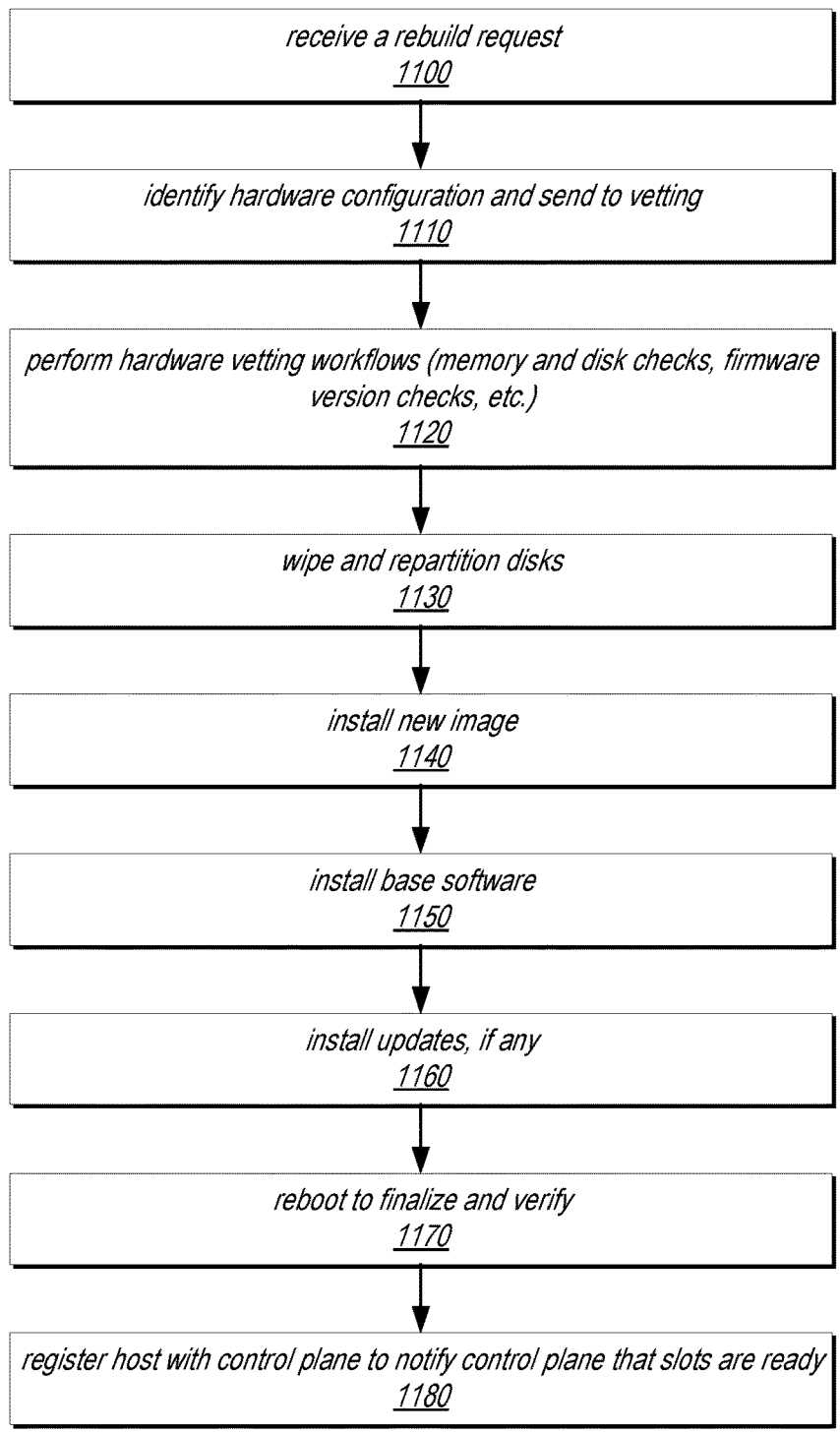
FIG. 6 is a flowchart of an example full rebuild procedure for a host, according to some embodiments.

FIG. 6 is a flowchart of an example full rebuild procedure for a host, according to some embodiments. As indicated at 1100, the host receives a rebuild request, for example from the pool management service. As indicated at 1110, hardware configuration of the host is identified, and sent to a vetting process. As indicated at 1120, the vetting process performs hardware vetting workflows (memory and disk checks, firmware version checks, etc.) to determine if the host hardware is sound. As indicated at 1130, after the vetting, the on-host disk(s) are wiped and repartitioned. As indicated at 1140, a new image for the host execution environment/VMM (see FIG. 2A) is installed. As indicated at 1150, base software for the host is installed. As indicated at 1160, any pending updates for the host software and/or firmware are installed. As indicated at 1170, the host is rebooted to finalize and verify the installation. As indicated at 1180, the rebuilt host is registered with the control plane of the provider network to notify the control plane that the host's slots are available. VMs may then be launched in the host's slots, for example from machine images maintained by the provider network.

The full rebuild procedure may take several hours, for example from 3 hours up to 10 or so hours in some cases. Thus, in some cases there may be a long delay between the time a client requests a slot and the time a VM is provisioned to the client's private network.

Embodiments of methods for reconfiguring hosts in a provider network are described in which hosts that are selected to be moved to another pool are evaluated to determine if one or more of the steps in the full rebuild procedure can be skipped when reconfiguring the hosts. If it is determined that one or more of the steps can be skipped for the host, then the host can be quickly reconfigured to implement slots of a different type by performing only the necessary step(s) and skipping (not performing) at least one step that is normally performed during a full rebuild procedure. The methods for reconfiguring hosts may thus, in at least some cases, reduce the delay between the time a client requests a slot and the time a VM is provisioned to the client's private network from several hours to a few minutes, for example ten minutes five minutes, or one minute depending on the number of steps that are not performed.

FIG. 3 illustrates a host pool management service in a provider network environment, according to some embodiments. A pool management service 306 implemented by a computer system comprising one or more computing devices on the provider network 300 may manage two or more logical pools 350 of hosts 340, with each pool 350 including hosts that implement one of the different types of slots provided by the provider network 300. For example, there may be three pools 350A-350C, with one pool 350A including hosts 354A that implement small slots, another pool 350B that includes hosts 340B that implement medium slots, and a third pool 350C that includes hosts 340C that implement large slots. The pool management service 306 may obtain, maintain, and update pool management data 320 including but not limited to information about the hosts 340 in the pools 350A-350C, including number of available slots, hardware and software configurations for the hosts 340, client(s) to which the hosts 340 or slots on the hosts 340 are allocated, usage information for resources on hosts 340 (e.g., memory usage patterns, disk usage patterns, etc.)

The provider network 300 may provide one or more services 304 implemented by computer systems comprising one or more computing devices on the provider network that provide APIs via which clients 390 may request slots of the different types for their respective private networks 310 on the provider network 300. Once a client 390 acquires a slot, a VM may be instantiated in the slot and configured as an instance 118 in the client's private network 310 according to the client's requirements. When a provider network service 304 receives a request for a slot of a particular type from a client 390, the provider network service 304 may send a request for an available slot of that type to the pool management service 306. The pool management service 306 locates an available slot on a host 340 in the pool 350 that provide slots of that type and notifies the requesting service 304 identifying the available slot. A VM as specified by the client may then be instantiated in the slot and provided as a resource instance 318 in the client's private network 310.

Figure 4A:
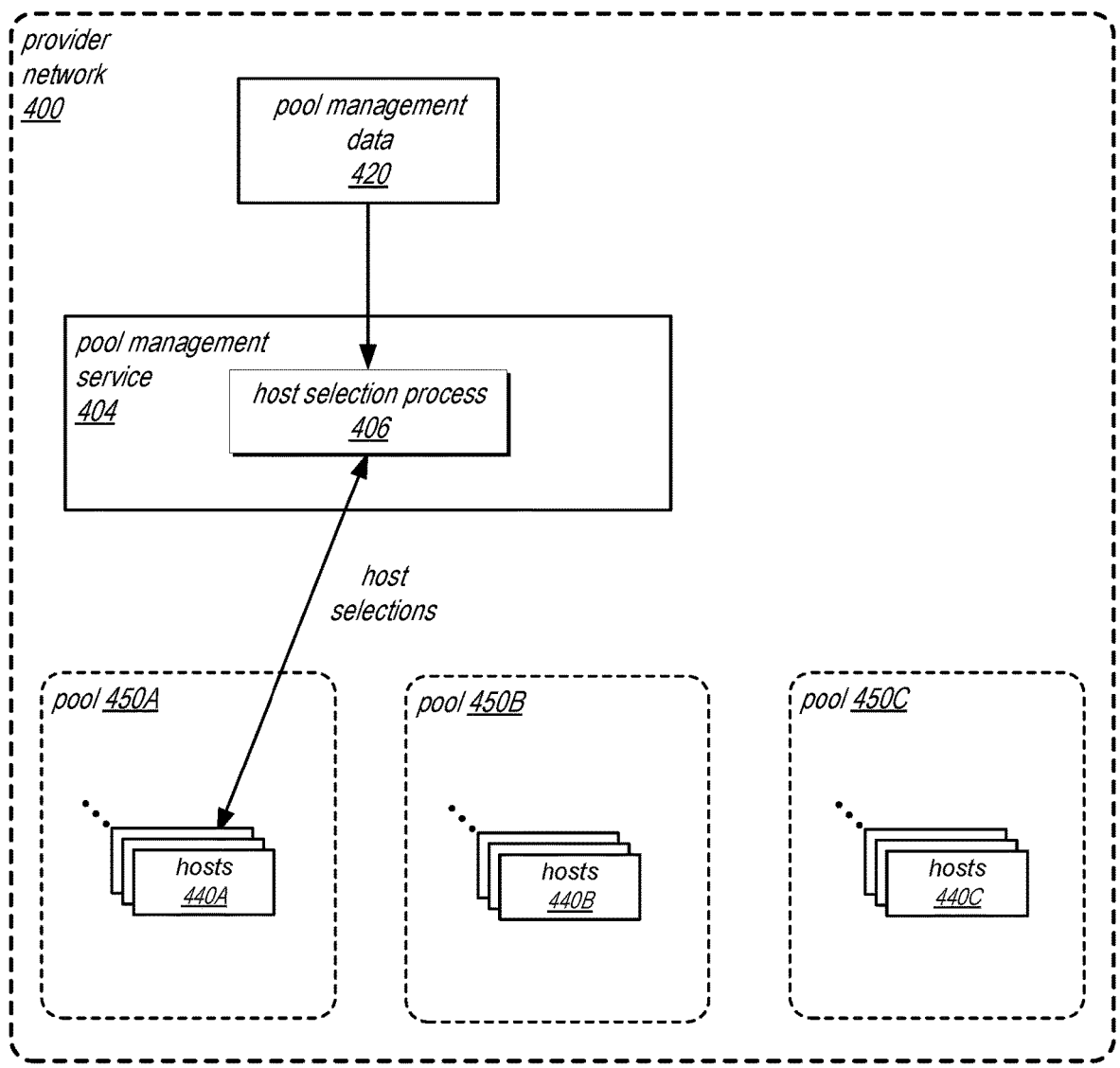
FIGS. 4A and 4B graphically illustrate a pool management service directing reconfiguration of hosts of one type of slot in one pool to hosts of another type of slot in another pool, according to some embodiments.
Figure 4B:
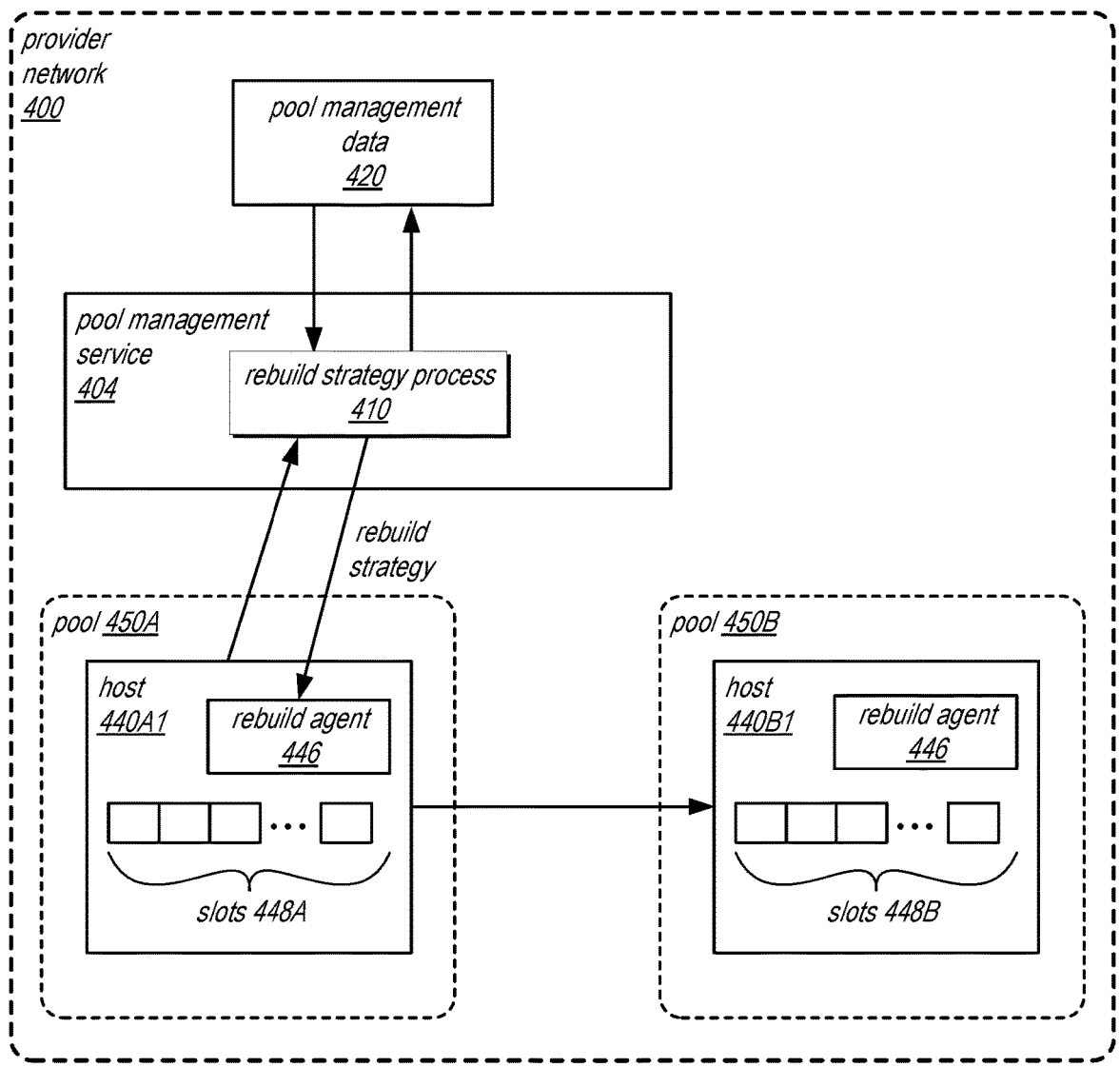

FIGS. 4A and 4B graphically illustrate a pool management service directing reconfiguration of hosts of one type of slot in one pool to hosts of another type of slot in another pool, according to some embodiments. In some embodiments, a pool management service 406, implemented by a computer system comprising one or more computing devices on the provider network 400, may monitor demand on the different types (e.g., different sizes) of slots maintained in the respective pools 450A-450C, and may move hosts 440 between pools if needed. Conventionally, to move a host from one pool to another pool, a full rebuild procedure is run on the host 440 to reconfigure the host 440 with slots of the target type, for example as illustrated in FIG. 5. However, the full rebuild procedure may take several hours, for example from 3 hours up to 10 or so hours in some cases. Thus, in some cases there may be a long delay between the time a client requests a slot and the time a VM is provisioned in the client's private network.

FIGS. 4A and 4B graphically illustrate methods and apparatus for reconfiguring hosts in a provider network in which hosts 440 that are selected to be moved to another pool are evaluated to determine if one or more of the steps in the full rebuild procedure can be skipped when reconfiguring the hosts 440. If it is determined that one or more of the steps can be skipped for a host 440, then the host 440 can be quickly reconfigured to implement slots of a different type by performing only the necessary step(s) and skipping (not performing) at least one step that is normally performed during a full rebuild procedure. The methods for reconfiguring hosts may thus, in at least some cases, reduce the delay between the time a client requests a slot and the time a VM is provisioned in the client's private network from several hours to a few minutes, for example ten minutes five minutes, or one minute depending on the number of steps that are not performed.

In FIG. 4A, pool management service 404 may detect that demand for slots of a type implemented by hosts 440C in pool 450C (e.g., small slots) is high, and/or that available (i.e., not assigned to clients) slots in pool 450C are low (e.g., below a threshold). A host selection process 406 of the pool management service 404 may select one or more hosts 450A from a pool 450A of hosts that implement slots of another type (e.g., large slots) according to host selection criteria to be moved to the pool 450C of hosts that implement slots of the type (e.g., small slots) that is in demand or is running low. In some embodiments, the pool management service 406 may obtain, maintain, and update pool management data 420 including but not limited to information about the hosts 440 in the pools 450A-450C, including number of available slots, hardware and software configurations for the hosts 440, client(s) to which the hosts 440 or slots on the hosts 440 are allocated, usage information for resources on hosts 440 (e.g., memory usage patterns, disk usage patterns, etc.) Host selection process 406 may access pool management data 420 and use at least some of this information in selecting the one or more hosts 450A in pool 450A that are to be moved to pool 450C. In some embodiments, host selection process 406 may instead or also query one or more of hosts 440A in pool 450A to obtain information that may be used in selecting one or more of the hosts 440A to be moved.

In FIG. 4B, a rebuild strategy process 410 of pool management service 404 may evaluate a selected host 440A1 in pool 450A that currently implements slots 448A of the other type according to rebuild strategy criteria to determine a rebuild strategy for reconfiguring the host 440A1 to implement slots 448B of the type provided by hosts in pool 440B. Rebuild strategy process 410 may access pool management data 420 and use at least some of this information in evaluating host 440A1. In some embodiments, the rebuild strategy process 410 may instead or also query host 440A1 to obtain information that may be used in the evaluation.

In some embodiments, the pool management service 404 may monitor results of execution of rebuild strategies on hosts 440; results information may, for example, be stored in pool management data 420. In some embodiments, the results of the previous executions of rebuild strategies on the hosts 440 may be provided as feedback to the rebuild strategy process 410 and used in determining the rebuild strategy for host 440A1.

The evaluation of host 440A1 by the rebuild strategy process 410 may determine that one or more of the steps in a full rebuild procedure that is typically used on the provider network 400 to reconfigure hosts (e.g., as illustrated in FIG. 6) can be skipped when reconfiguring the host 440A1. In some embodiments, the rebuild strategy that is determined for host 440A1 may be provided to a rebuild agent 446 executing on host 440A1; the rebuild agent 446 may then perform a rebuild of host 440A1 according to the rebuild strategy to reconfigure the host to implement slots 448B of the type provided by hosts in pool 440B. In at least some cases, at least one of the steps in the full rebuild procedure is not performed. Once the reconfiguration is complete, the host 440A1 becomes available as a host 440B1 that implements slots 448B in pool 450B. While not shown, in some embodiments, the rebuild strategy may instead be provided to a process executing on a device external to host 440A1, which then executes the rebuild strategy to reconfigure the target host 440A1.

Figure 7:
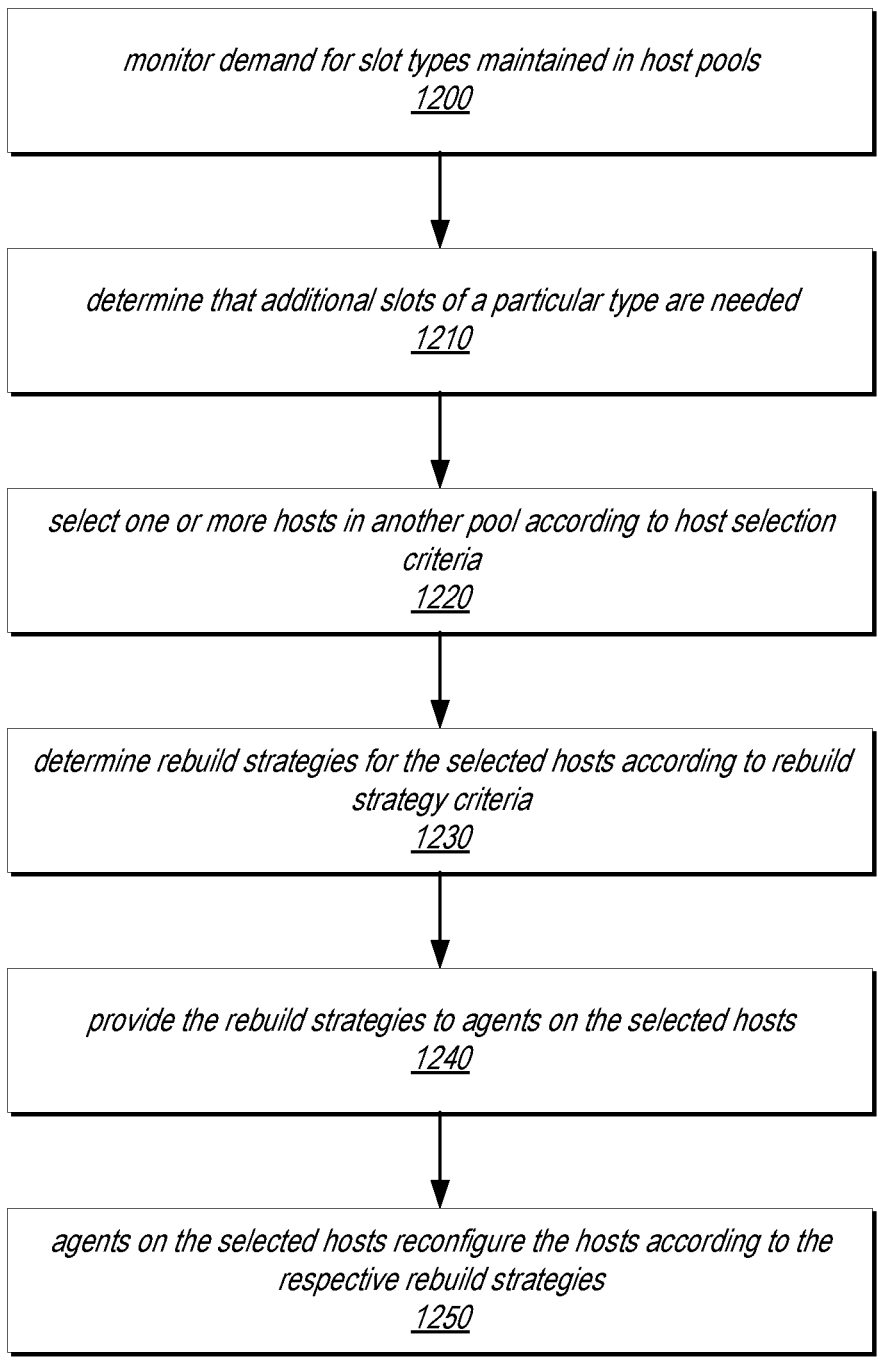
FIG. 7 is a high-level flowchart of a method for selecting hosts to be moved from one pool to another pool and for selecting a rebuild strategy for the selected hosts, according to some embodiments.

FIG. 7 is a high-level flowchart of a method for selecting hosts to be moved from one pool to another pool and for selecting a rebuild strategy for the selected hosts, according to some embodiments. As indicated at 1200, demand for slots of different types maintained in host pools, as well as the number of available slots provided by the hosts in the host pools, may be monitored, for example by a pool management service of the provider network. As indicated at 1210, the pool management service may determine that additional slots of a particular type are needed in a respective host pool. As indicated at 1220, one or more hosts in another pool may be selected according to host selection criteria. As indicated at 1230, rebuild strategies may be determined for the selected hosts according to rebuild strategy criteria. Example factors that may be considered and methods that may be performed in determining a rebuild strategy for a host are described in reference to element 1510 of FIG. 10. As indicated at 1240, the rebuild strategies may be provided to agents on the selected hosts. As indicated at 1250, the agents on the selected hosts reconfigure the hosts according to the respective rebuild strategies.

Figure 8:
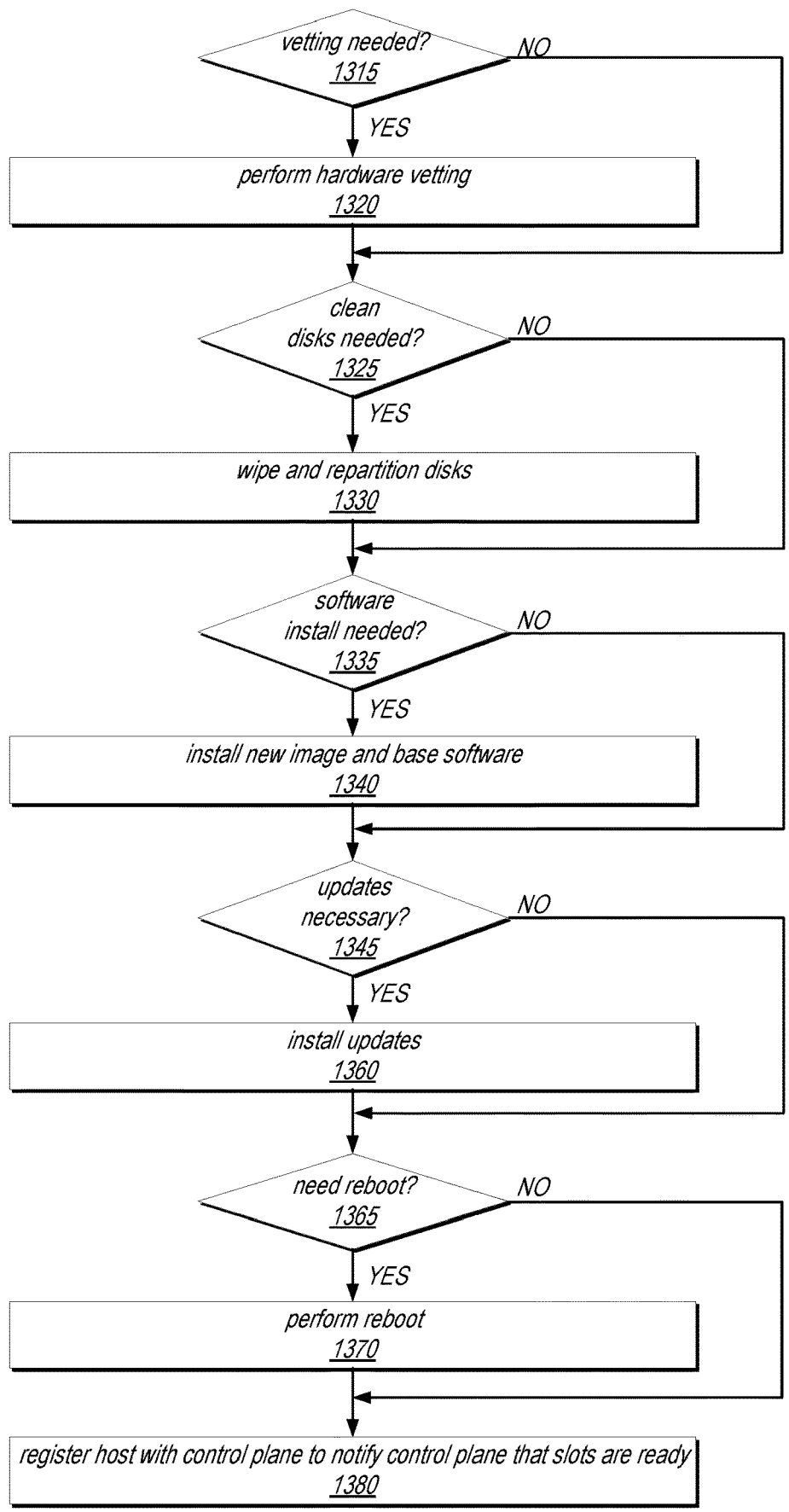
FIG. 8 is a flowchart of an example full rebuild procedure for a host in which one or more steps are skipped, according to some embodiments.

FIG. 8 is a flowchart of an example full rebuild procedure for a host in which one or more steps are skipped, according to some embodiments. The method of FIG. 8 may, for example, be performed by an agent on a host according to a rebuild strategy determined by a rebuild strategy process of a pool management service as illustrated in FIG. 4B, and may, for example, be performed at element 1250 of FIG. 7. Alternatively, the rebuild strategy may be provided to a process executing on a device external to the host, which then performs the rebuild strategy to rebuild the target host.

At 1315, if the rebuild strategy indicates that hardware vetting is needed for the host, then hardware vetting may be performed as indicated at 1320. In hardware vetting, the hardware configuration of the host is identified and sent to a vetting process. The vetting process performs hardware vetting workflows (memory and disk checks, firmware version checks, etc.) to determine if the host hardware is sound. At 1315, if the rebuild strategy indicates that hardware vetting is not needed for the host, then element 1320 is skipped (not performed).

At 1325, if the rebuild strategy indicates that clean disks are needed on the host, then as indicated at 1330 the disk(s) on the host may be wiped to delete any data on the disk(s), and the disk(s) may be repartitioned. At 1325, if the rebuild strategy indicates that clean disks are not needed, then element 1330 is skipped.

At 1335, if the rebuild strategy indicates that a software install is needed on the host, then as indicated at 1340 a new image for the host execution environment/VMNI and base software may be installed on the host. At 1335, if the rebuild strategy indicates that a software install is not needed, then element 1340 is skipped.

At 1345, if the rebuild strategy indicates that software and/or firmware updates are required on the host, then as indicated at 1360 the updates are installed. At 1345, if the rebuild strategy indicates that software and firmware updates are not required, then element 1360 is skipped.

At 1365, if the rebuild strategy indicates that the host needs to be rebooted, then as indicated at 1370 the host is rebooted to finalize and verify the installation. At 1365, if the rebuild strategy indicates that the host does not need to be rebooted, then element 1370 is skipped.

As indicated at 1380, the rebuilt host is registered with the control plane of the provider network to notify the control plane that the host's slots are available. VMs may then be launched in the host's slots, for example from machine images maintained by the provider network.

Figure 9:
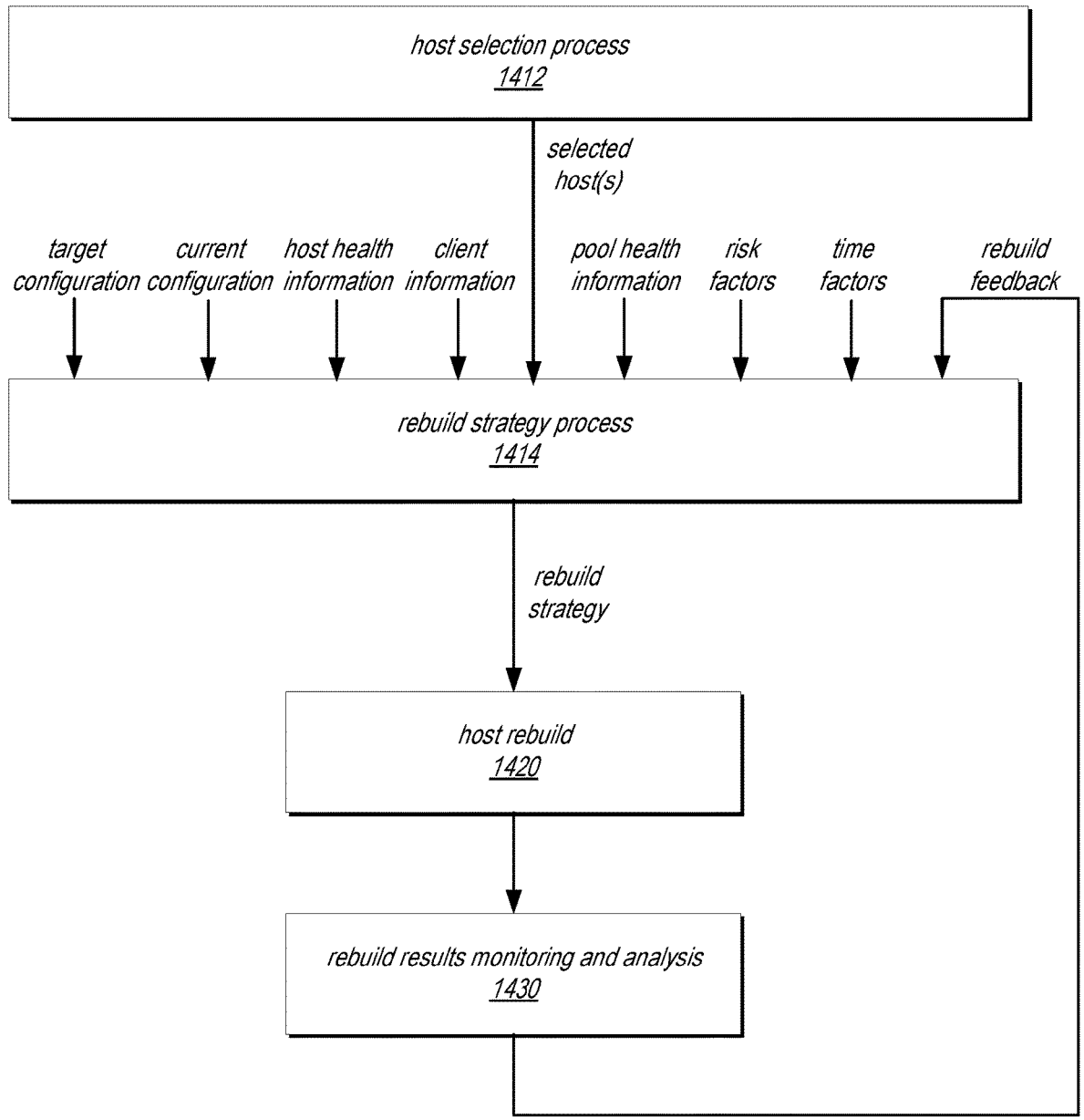
FIG. 9 illustrates determining and applying rebuild strategies according to various criteria, according to some embodiments.

FIG. 9 illustrates determining and applying rebuild strategies according to various rebuild criteria, according to some embodiments. A host selection process 1412 of the pool management service for example implemented by a pool management service as shown in FIG. 4A, may select one or more hosts from a pool of hosts that implement slots of another type (e.g., large slots) according to host selection criteria to be moved to a pool of hosts that implement slots of a type (e.g., small slots) that is in demand or is running low. The host selection process 1412 may provide an indication of the selected host(s) to a rebuild strategy process 1414, for example implemented by a pool management service as shown in FIG. 4B. In some embodiments, rebuild criteria for a host may be input to or otherwise obtained by the rebuild strategy process 1414; the rebuild criteria may include one or more of, but are not limited to, the current host configuration, the target host configuration, host status/health information, pool health information, client information, risk factors, time factors, and feedback from previous rebuilds of hosts. The rebuild criteria for a host may be used by the rebuild strategy process 1414 in determining a rebuild strategy for a host that may indicate that one or more steps of the full rebuild procedure can be skipped for the host. Example factors that may be considered and methods that may be performed in determining a rebuild strategy for a host are described in reference to element 1510 of FIG. 10. The rebuild strategy may then be provided to an agent on the host (or, alternatively, to a process executing on a device external to the host) which performs a host rebuild 1420 according to the rebuild strategy to reconfigure the host to implement slots of a different type. In some embodiments, a rebuild results monitoring and analysis 1430 process, for example implemented by a pool management service as shown in FIGS. 4A and 4B, may monitor and analyze results of rebuilds performed according to the rebuild strategies; information about the results generated by the analysis may be provided as feedback to the rebuild strategy process 1414 for use in making decisions when evaluating hosts.

Figure 10:
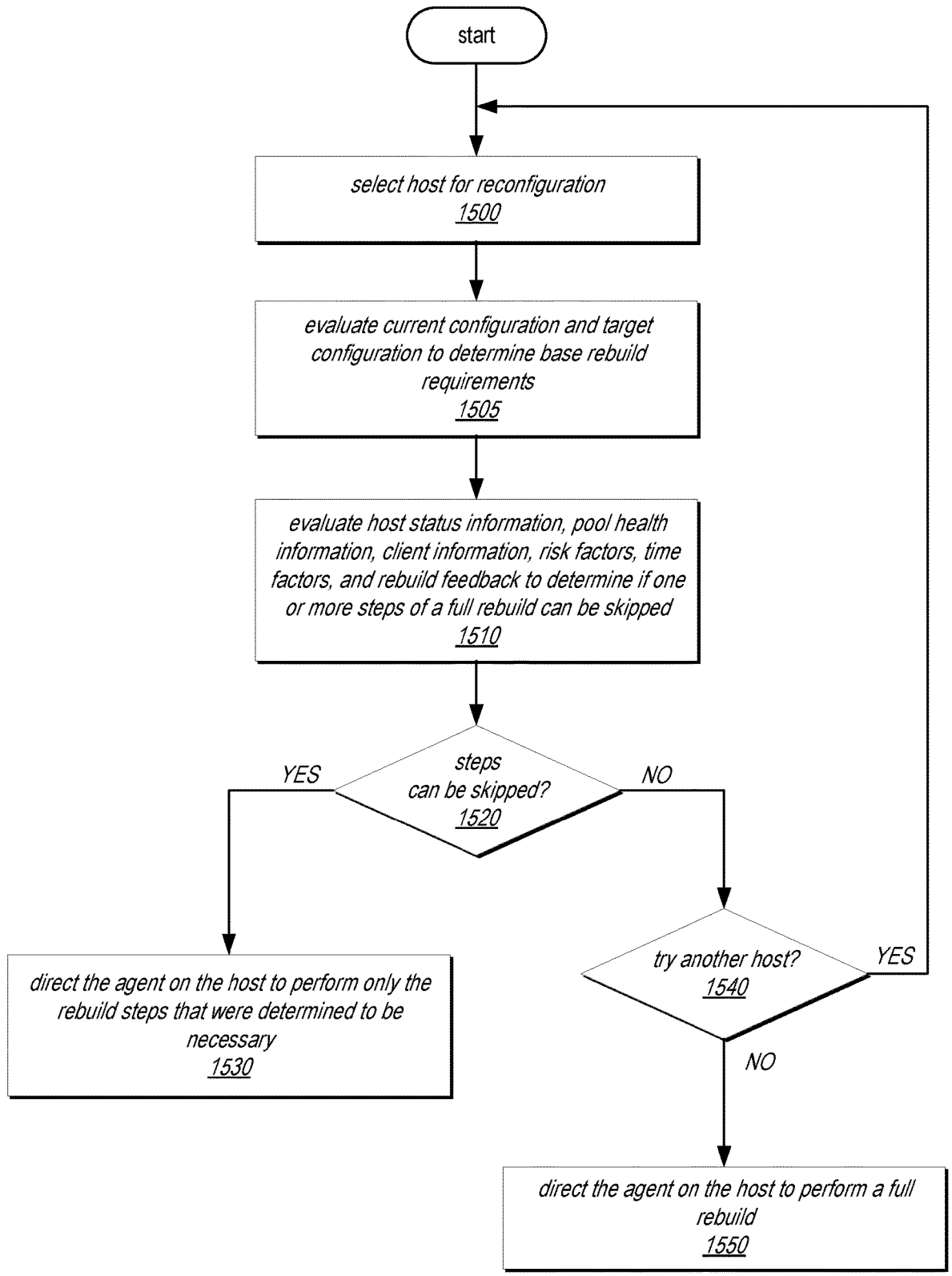
FIG. 10 is a flowchart of a method for determining and applying rebuild strategies according to various criteria, according to some embodiments.

FIG. 10 is a flowchart of a method for determining and applying rebuild strategies according to various criteria, according to some embodiments. The method of FIG. 10 may, for example, be performed by a rebuild strategy process of a pool management service as illustrated in FIGS.

4B and 9. As indicated at 1500, a host may be selected by the pool management service to be moved to another pool. As indicated at 1505, the current configuration of the selected host and a target configuration for the selected host may be evaluated to determine base rebuild requirements (e.g., the type of slots that are currently implemented on the host, and the type of slots that are to be implemented on the host during the rebuild process). As indicated at 1510, rebuild criteria including but not limited to host status/health information, pool health information, client information, risk factors, time factors, and/or rebuild feedback may be used in determining if one or more steps of a full rebuild procedure for hosts on a provider network, for example as illustrated in FIG. 8, can be skipped for this host.

The following describes example factors that may be considered and methods that may be performed at element 1510 of FIG. 10 in some embodiments to determine if one or more steps of a full rebuild procedure can be skipped for a host. Referring to FIG. 8 as an example, high-level steps in a full rebuild procedure may include one or more of, but are not limited to, hardware vetting, disk cleaning, software installation, updates, and reboot. For each step, a rebuild strategy process of a pool management service as illustrated in FIGS. 4B and 9 may evaluate one or more criteria in light of time factors, risk factors, and the base rebuild requirements (e.g., the type of slots that are currently implemented on the host, and the type of slots that are to be implemented on the host during the rebuild process) to determine if one or more processes of the step that are normally performed in the full rebuild procedure may be skipped for the host. Time factors may, for example, indicate time constraints for providing the slots, for example if the slots of the type to be provided by the host after the rebuild are needed immediately, as soon as possible, within some number of minutes (e.g., 5 minutes, 10 minutes, etc.), within an hour, or if there is no time limit on when the slots are needed. Risk factors may, for example, include acceptable risk constraints or thresholds for skipping one or more of the steps or processes of the steps.

In some embodiments, the time factors may affect the risk thresholds; for example, the rebuild strategy process may accept a higher level of risk in skipping one or more of the steps or processes of the steps if the slots are needed immediately or as soon as possible. In some embodiments, the pool health information may affect the time and/or risk factors. For example, if the pool of hosts to which the host is to be moved is critically low, then the additional slots provided by the host may be needed immediately or as soon as possible, and a higher level of risk may be acceptable to meet the time constraint. Conversely, if the pool of hosts to which the host is to be moved is in relatively good shape, then the time constraint may be relaxed, and a less risky but longer rebuild process may be selected.

In some embodiments, other factors or inputs may affect the time and/or risk factors, and may also affect whether certain steps can be skipped or should be performed. For example, in some embodiments, a user interface to a provider network service may be provided to provider network customers that allows the customers to specify the type and number of slots needed. The user interface may also allow the customers to specify a time constraint (e.g., immediately, as soon as possible, within an hour, or no constraint) and/or an acceptable level of risk that the customers are willing to take; customer inputs from the user interface may be provided to the rebuild strategy process as time and/or risk factors. Thus, a customer may indicate when requesting one or more slots of a particular type that the slots are needed immediately or as soon as possible, and/or may indicate a level of risk that is acceptable in order to get the slots as soon as possible. As another example, client information may include information about client(s) that currently or have had VMs executing on slots of the target host, and/or information about client(s) to which slots of the target type are to be provided after the rebuild. For example, information about a client may indicate that a client's VMs that are to execute in slots after the rebuild implement critical applications and are not tolerant to failures, and therefore the client may be risk-averse. As another example, information about a client that has had VMs executing in slots of the target host may indicate that the client's applications implemented by the VMs handle sensitive data, and therefore the disk cleaning step should be performed.

In some embodiments, feedback from previous rebuilds based on rebuild strategies may affect time and/or risk factors, and may also affect whether certain steps can be skipped or should be performed. For example, if skipping certain steps or certain processes in steps in rebuilds has resulted in a significant number of failures or other problems on hosts and/or complaints from customers with VMs executing on the hosts, then the risk level for skipping those steps or processes may be raised. Conversely, if skipping certain steps or certain processes in steps in rebuilds has not resulted in failures or other problems on hosts and/or complaints from customers with VMs executing on the hosts, then the risk level for skipping those steps or processes may be lowered.

At the hardware vetting step of the full rebuild process, one or more hardware vetting workflows (memory and disk checks and stress tests, firmware version checks, etc.) may be performed to determine if the host hardware is sound. In some embodiments, in evaluating whether the workflows of the hardware vetting step can be skipped, the rebuild strategy process may look at status/health information for the host to determine how recently the vetting workflows were performed for the hardware components. If the vetting workflows have been performed within an acceptable time period (e.g., within the last week, or within the last two weeks), then the rebuild strategy process may decide that one or more of the hardware vetting workflows can be skipped for the host. In some embodiments, the rebuild strategy process may also look at the status/health information for the host to determine if any of the hardware components have been experiencing problems that generate errors. If a hardware component has not been generating any errors, or if the number of errors are below an acceptable threshold, then the hardware vetting workflow for that component may be skipped. The rebuild strategy process may also check the firmware version of the to make sure that the firmware is up to date, or at least at an acceptable level with no pending critical firmware update, and may decide that a firmware update is thus not necessary at this time and can be skipped.

At the disk cleaning step of the full rebuild process, the on-host disk(s) are wiped and repartitioned. In some embodiments, in evaluating whether the steps of the disk cleaning step can be skipped for a host, the rebuild strategy process may look at status/health information for the host to determine health of the disk(s) and current partitioning to determine if the disk health and partitioning are acceptable; if they are, then the disk cleaning step may be skipped. In some embodiments, the rebuild strategy process may also look at information about client(s) that have had VMs executing in slots of the target host to determine whether the clients' applications implemented by the VMs handled sensitive data. If the disk(s) may include clients' sensitive data, the disk cleaning step should be performed; otherwise, the disk cleaning step may be skipped.

At the software installation step of the full rebuild process, a new image for the host execution environment/VMM is installed, and base software for the host is installed. In some embodiments, in evaluating whether the software installs of the software installation step can be skipped for a host, the rebuild strategy process may the rebuild strategy process may look at status/health information and the base rebuild requirements (e.g., the type of slots that are currently implemented on the host, and the type of slots that are to be implemented on the host during the rebuild process) to determine if the software installation step, or one or more installs of the step, may be skipped. For example, the rebuild strategy process may look at the versions of the currently installed software components to determine if the software components are sufficiently up-to-date and support the type of slots that are to be implemented on the host during the rebuild process. If so, at least part of the software installation step may be skipped. As another example, the rebuild strategy process may look at health information for the host to determine if the software has been executing for a period without generating errors; if the software has been generating errors or is otherwise suspect, the software installation step may need to be performed, and otherwise may be skipped.

At the update step of the full rebuild process, any pending updates for the host software and/or firmware are installed. In some embodiments, in evaluating whether the updates of the update step can be skipped for a host, the rebuild strategy process may look at current software and/or firmware versions on the host (or software and/or firmware versions of software that is to be installed on the host, if the software install step is to be performed) to determine if there are any pending critical updates or necessary updates support the type of slots that are to be implemented on the host during the rebuild process. The rebuild strategy process may decide to skip any updates that are not critical or necessary for the rebuild.

At the reboot step of the full rebuild process, the host is rebooted to finalize and verify the installation. In some embodiments, in evaluating whether the reboot step can be skipped for a host, the rebuild strategy process may examine what it has determined is to be performed or is to be skipped in the rebuild strategy for the host to determine if the reboot can be skipped. For example, some firmware updates, software installs, and software updates may require a reboot, while others may not.

At 1520, if the rebuild strategy process determines that one or more steps of the full rebuild procedure can be skipped, then as indicated at 1530, the rebuild strategy process may direct the rebuild agent on the host (or a host rebuild process executing on a device external to the host) to perform only the rebuild steps that were determined to be necessary, for example by providing a rebuild strategy that indicates the steps that are to be performed and/or the steps that can be skipped. At 1520, if the rebuild strategy process determines that the steps in the full rebuild procedure need to be performed and thus should not be skipped for this host, then at 1540 at least some of the rebuild criteria may be evaluated to determine if a different host should be selected for reconfiguration. For example, if a time factor indicates that slots of the target type are needed as soon as possible, but the evaluation of the host indicates that skipping one or more steps of the rebuild process for this host is above a risk threshold, then at 1540 the method may return to element 1500 to select and evaluate a different host. At 1540, if it is decided to not select another host but instead to proceed with a rebuild of the currently selected host, then as indicated at 1550 the pool management service may direct the agent on the host (or a host rebuild process executing on a device external to the host) to perform a full rebuild procedure, for example as indicated in FIG. 6.

FIGS. 9 and 10 illustrate a method in which a host is selected to be moved to another pool, and then a rebuild strategy is determined for the selected host. In some embodiments, however, status and health of the hosts in the pools may be continuously monitored. When a host is needed in another pool, a host may be selected based at least in part on the known status of the hosts, time factors, and risk factors. In selecting a host, the known status (e.g., health) of the hosts may be used in determining appropriate rebuild strategies for the hosts; if the rebuild strategy for a host allows the host to be rebuilt while meeting time and risk constraints, then the host may be selected as a candidate to be rebuilt and moved to another pool. If no host with a rebuild strategy that meets the time and risk constraints is found, then the time constraints or the risk constraints may be relaxed and the hosts may be re-examined according to the relaxed constraints to locate a candidate host, or alternatively a best candidate host may be selected. FIGS. 11 and 12A-12C illustrate methods in which the status of hosts is continuously monitored, and in which hosts in one pool are selected to be moved to another pool based on the known status information and other criteria including but not limited to risk and time factors.

Figure 11:
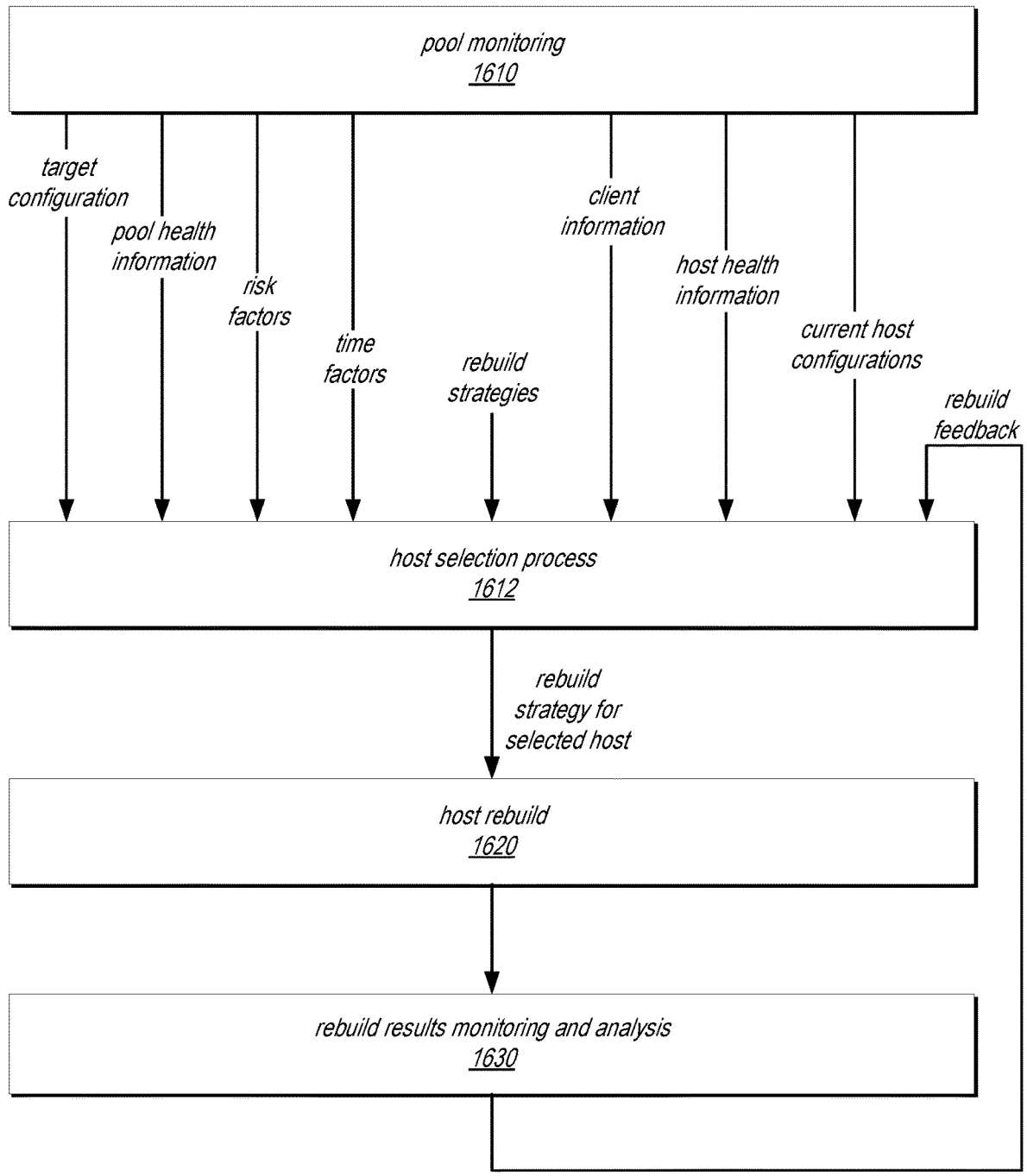
FIG. 11 illustrates selecting hosts to be moved to another pool based on host status information and other criteria including but not limited to risk and time factors, according to some embodiments.
Figure 13:
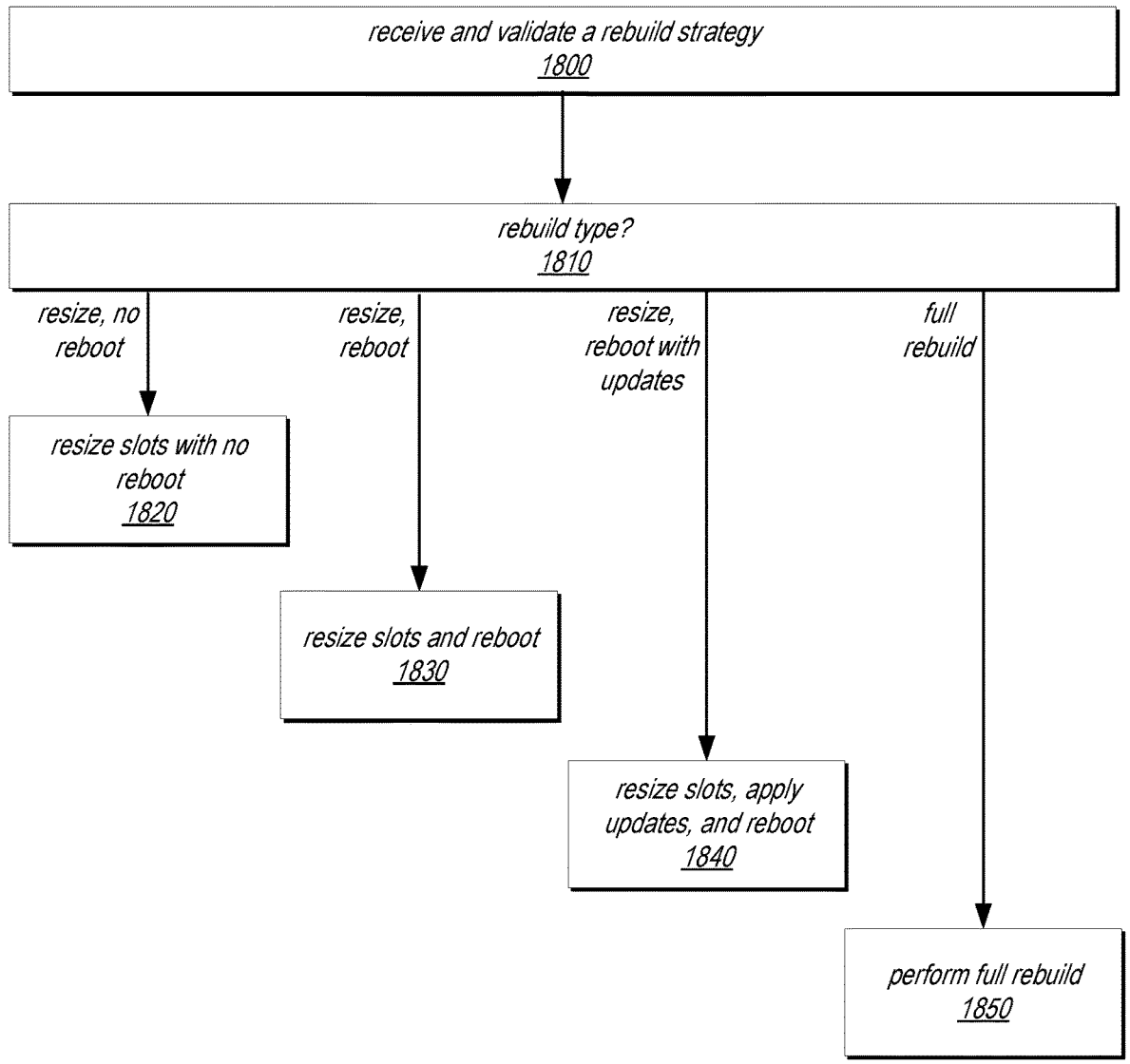
FIG. 13 is a flowchart of a method of applying various rebuild strategies on a host, according to some embodiments.

FIG. 11 illustrates selecting hosts to be moved to another pool based on host status information and other criteria including but not limited to risk and time factors, according to some embodiments. In some embodiments, a pool monitoring process 1610, for example implemented by a pool management service as illustrated in FIG. 3, may continuously monitor the status and health of the pools of hosts, monitor demand on the slots implemented by the hosts in the pools, and may also continuously monitor the health and status of the hosts within the pools. Upon detecting that a pool needs additional hosts, the pool monitoring process 1610 may notify a host selection process 1612, for example implemented by a pool management service as shown in FIG. 4A. The host selection process 1612 may obtain or receive information for use in selecting a candidate host. The information may be received from the pool monitoring process 1610, and/or obtained from a store of pool management data as illustrated in FIG. 4A. In some embodiments, information obtained by or input to the host selection process 1612 may include one or more of, but is not limited to, current host configurations, a target host configuration, host status/health information, pool health information, client information, risk factors, time factors, and feedback from previous rebuilds of hosts. In some embodiments, two or more rebuild strategies for hosts, for example as illustrated in FIG. 13, may also be obtained by the host selection process 1612. The information may be used by the host selection process 1612 in selecting a candidate host from a pool to be moved to the target pool, as well as in determining an appropriate rebuild strategy for the candidate host. The rebuild strategy may then be provided to an agent on the host (or, alternatively, to a process executing on a device external to the host) which performs a host rebuild 1620 according to the strategy to reconfigure the host to implement slots of a different type. In some embodiments, a rebuild results monitoring and analysis 1630 process, for example implemented by the pool management service as shown in FIGS.

4A and 4B, may monitor and analyze results of rebuilds performed according to the rebuild strategies; information about the results generated by the analysis may be provided as feedback to the host selection process 1612 for use in making decisions when selecting hosts.

Figure 12A:
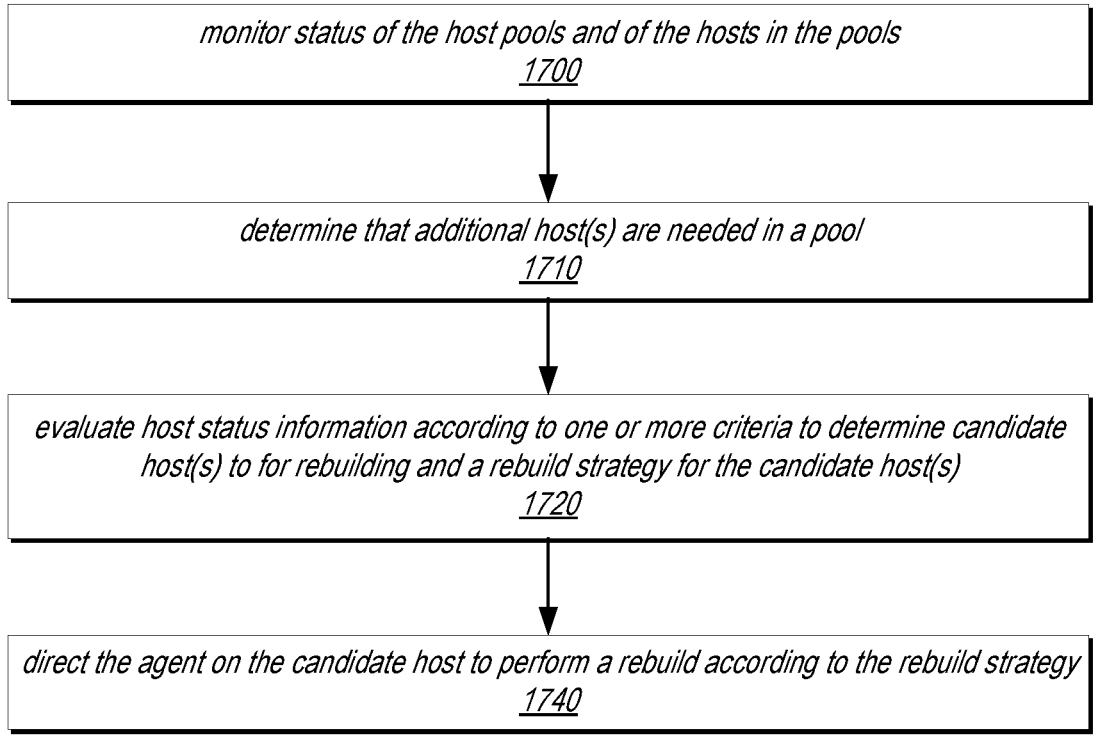
FIGS. 12A through 12C are flowcharts of methods for selecting hosts to be moved to another pool based on host status information and other criteria including but not limited to risk and time factors, according to some embodiments.
Figure 12B:
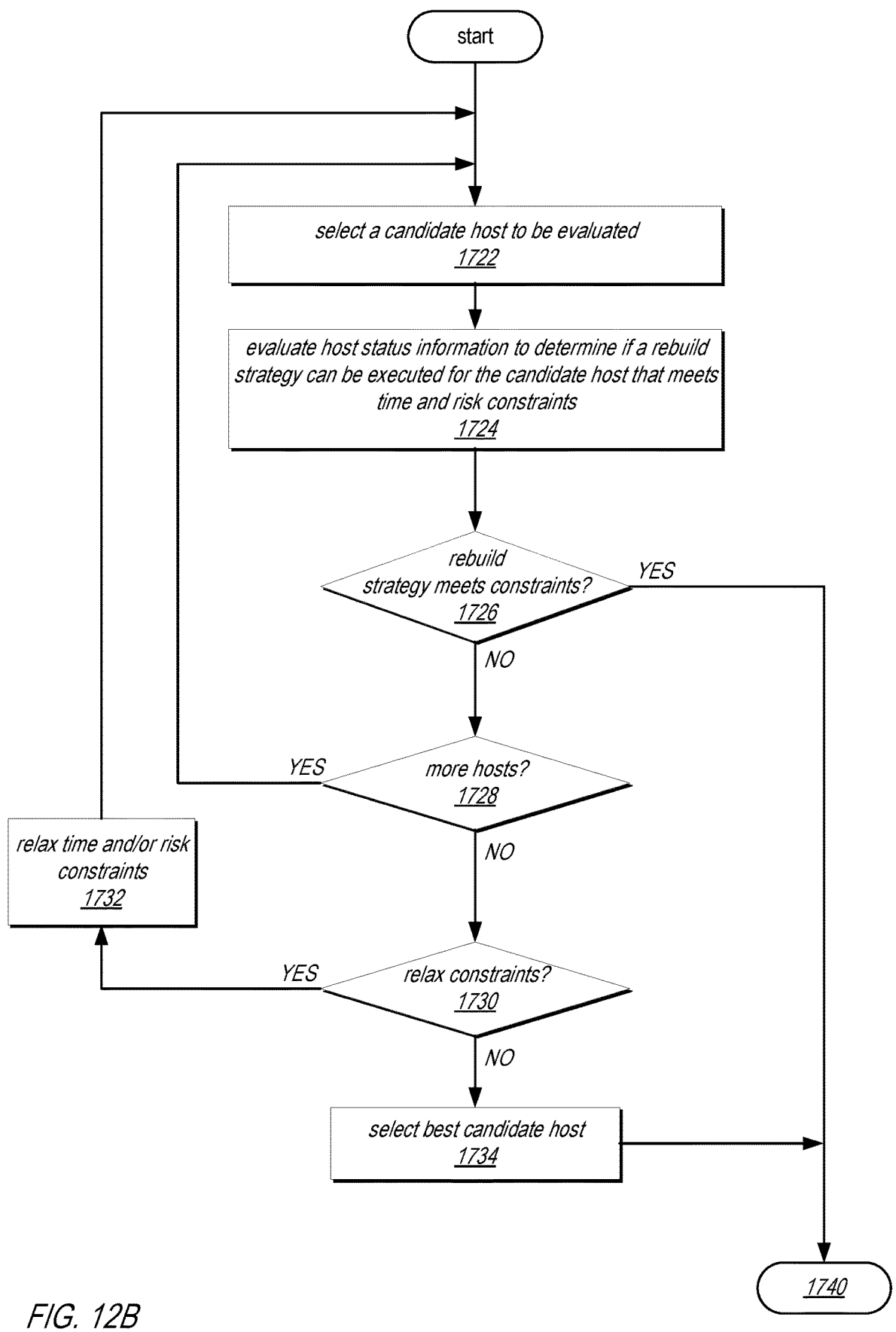
Figure 12C:
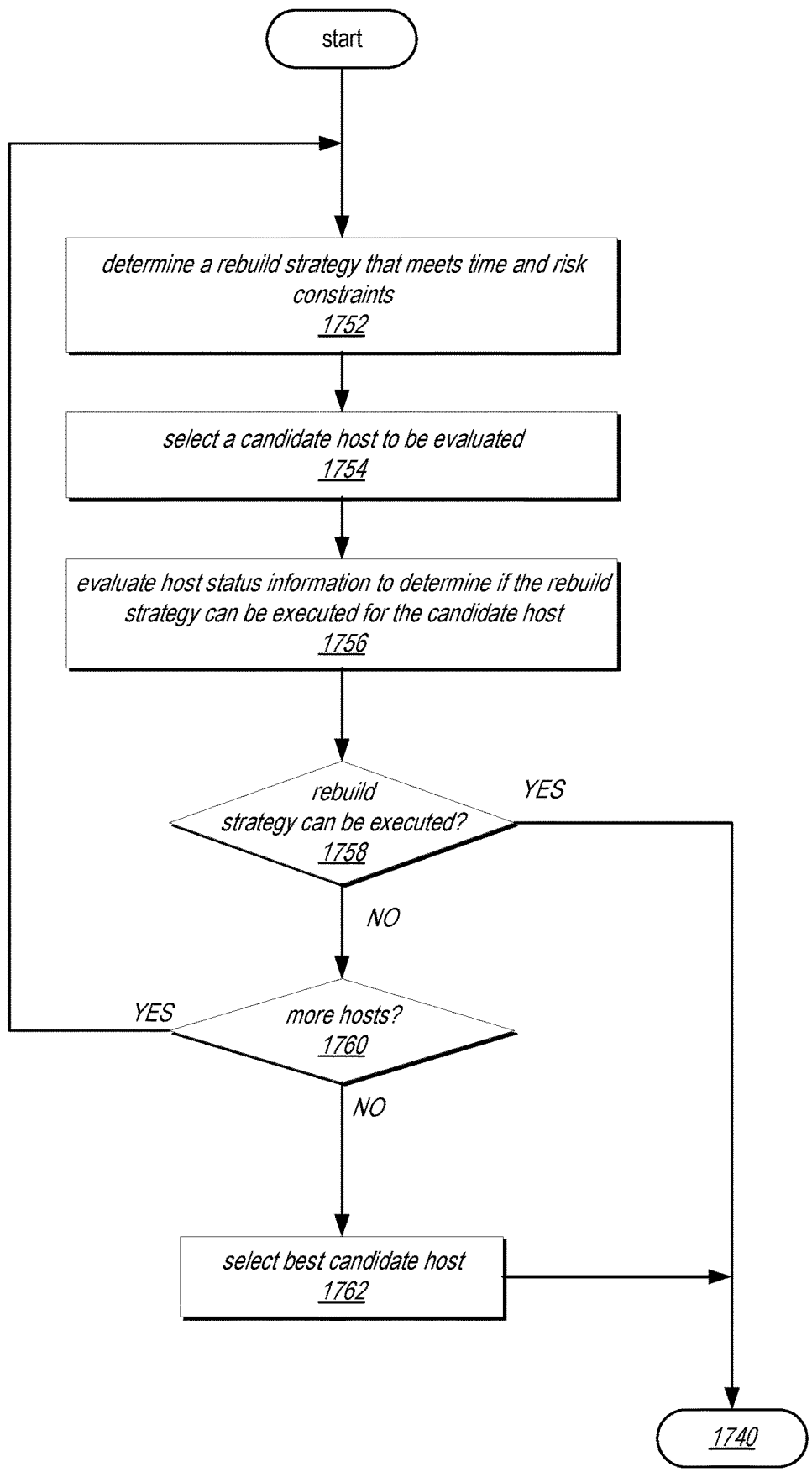

FIGS. 12A through 12C are flowcharts of methods for selecting hosts to be moved to another pool based on host status information and other criteria including but not limited to risk and time factors, according to some embodiments. FIG. 12A is a high-level flowchart of a method for selecting hosts to be moved to another pool based on host status information and other criteria including but not limited to risk and time factors, according to some embodiments. As indicated at 1700, a pool monitoring process may monitor status of the host pools and of the hosts in the pools. As indicated at 1710, the pool monitoring process may determine that additional host(s) are needed in a pool, and may notify and provide relevant information (e.g., the target pool, how many slots or hosts are needed, time constraints (how quickly the slots are needed), etc.) to a host selection process. As indicated at 1720, the host selection process may evaluate host status information for hosts in a pool from which hosts are to be selected according to one or more criteria, including but not limited to time constraints and risk constraints, to determine one or more candidate hosts to for rebuilding and a rebuild strategy for the candidate host(s). A method for evaluating hosts that may be performed at element 1720 is illustrated in FIG. 12B. As indicated at 1740, the pool monitoring process may direct an agent on the candidate host to perform a rebuild according to the rebuild strategy. Alternatively, the rebuild strategy may be provided to a process executing on a device external to the target host, which may then perform the rebuild strategy to rebuild the target host.

FIG. 12B is a flowchart of a method for evaluating host status information according to one or more criteria to determine a candidate host to for rebuilding and a rebuild strategy for the candidate host, according to some embodiments. The method of FIG. 12B may, for example, be performed at element 1720 of FIG. 12A. As indicated at 1722, a host may be selected from the source pool for evaluation. For example, in some embodiments, the host status information may indicate the status of the hosts' slots (e.g., how many and which slots are empty (available) or occupied (currently executing a VM), and a host may be selected that has the most available slots, or that has enough available slots (e.g., above a threshold) to be a candidate for rebuilding. As another example, in some embodiments, the host status information may include health information for the hosts (e.g., how long has the host been running in the current configuration, etc.) and/or for components of the hosts (e.g., memory, storage, etc.), and a host that is determined to be healthiest, or above a health threshold, may be selected as a candidate for rebuilding. Other methods for selecting candidate hosts may be used in various embodiments.

As indicated at 1724, the host status information for the candidate host may be evaluated to determine if a rebuild strategy can be executed for the host that meets time constraints and risk constraints. The host selection process may generate or obtain a rebuild strategy for the candidate host. For example, in some embodiments, the host status information for the candidate host may include health information for the host (e.g., how long has the host been running in the current configuration, etc.) and/or for components of the host (e.g., memory, storage, etc.); the health information for the host may be evaluated to determine which steps in a full rebuild procedure can be skipped for this host. FIG. 8 is a flowchart of an example full rebuild procedure for a host in which one or more steps may be skipped, according to some embodiments. Referring to FIG. 8 as an example, in some embodiments the host selection process may evaluate relevant host health information for the candidate host (and possibly other host-related information such as security requirements for client data currently stored in the host's storage) at one or more of elements 1315, 1325, 1335, 1345, and 1365 to determine if the corresponding rebuild steps 1320, 1330, 1340, 1360, and 1370 need to be performed or can be skipped, and may generate a rebuild strategy for the host that indicates the steps of a full rebuild that should be performed for the respective host and/or the steps that can be skipped for the respective host according to the evaluation. However, in some embodiments, the pool management service (e.g., the pool monitoring process of the service) may maintain and update rebuild strategies (e.g., as pool management data as shown in FIG. 3) for the hosts in the pools based on health information obtained for the hosts; the rebuild strategies for each host may indicate the steps of a full rebuild that should be performed for the respective host and/or the steps that can be skipped. In these embodiments, instead of generating a rebuild strategy for the candidate host, the host selection process may obtain a current rebuild strategy for the selected candidate host, for example from pool management data as shown in FIG. 3.

At 1724, after generating or obtaining a rebuild strategy for the candidate host, the host selection process may evaluate the rebuild strategy according to time constraints and risk constraints to determine if the candidate host is an acceptable candidate for rebuilding. The host selection process may be aware of how long a given rebuild strategy should take (e.g., seconds, minutes, hours). The time constraints may be obtained from the pool monitoring process, and may indicate how soon slots of the target type are needed. For example, a time constraint for a request for slots received from the pool monitoring process may indicate that the slots are needed immediately or as soon as possible, within 1 minute, within 5 minutes, within an hour, or that there is no time constraint (e.g., provide the slots whenever possible). The risk constraints may indicate levels or thresholds of risk that are acceptable in skipping one or more of the steps of the full rebuild procedure. A host may be determined as an acceptable candidate if the host can be rebuilt according to the strategy within the time constraints and with an acceptable level of risk. In some embodiments, if the current rebuild strategy does not allow the candidate host to be rebuilt within the given time constraints, then one or more steps may be eliminated from the rebuild strategy if the step(s) can be skipped with an acceptable level of risk. For example, there may be an acceptable risk threshold for skipping hardware vetting, an acceptable risk threshold for skipping disk cleaning, and so on. Thus, there may be a trade-off between risk and time; a higher level of risk may be acceptable if the slots are needed as soon as possible or immediately. Conversely, more time may be needed if a host cannot be rebuilt within the time constraints without assuming too much risk.

The risk constraints may be relaxed or increased according to the time constraints. For example, if the slots are needed immediately or as soon as possible, a higher level of risk may be acceptable in skipping one or more of the steps. As another example, if the slots are needed whenever possible with no time constraint, then a low level of risk, or no risk, may be acceptable in skipping one or more of the steps, and a full rebuild procedure may thus need to be performed for this host. Other factors may be considered when determining an acceptable level of risk. For example, security concerns for a client's data stored on the candidate host may indicate that the host's disks should be wiped and repartitioned. As another example, the health and history of particular host hardware components (e.g., memory, disks, processors, etc.) may indicate that skipping vetting for the component(s) carries a high level of risk, and thus the hardware should be vetted (e.g., if a hardware component has generated a significant number of errors over a time period) or if vetting can be safely skipped with very low risk (e.g., if the hardware components have been performing well for a time period without a significant number of errors). As another example, if the host status information indicates that software and/or firmware on the host device does not have any pending critical updates, then a software and/or firmware update step of the full rebuild procedure may be safely skipped for this host with low risk. However, if the host status information indicates that software and/or firmware on the host does have pending critical updates, then a software and/or firmware update step of the full rebuild procedure should be performed for this host.

At 1726, if the rebuild strategy for the host can be performed within the time constraints at an acceptable level of risk, then the method may proceed to element 1740 of FIG. 12A to rebuild the host according to the rebuild strategy. Otherwise, the method goes to element 1728. At 1728, if there are more hosts in the source pool that can be evaluated as candidates for rebuilding, then the method returns to element 1722 to select and evaluate another candidate host. Otherwise, the method proceeds to element 1730. At element 1730, it may be decided to relax one or both of the time and risk constraints, in which case the method relaxes the time and/or risk constraints as indicated at 1732 and returns to element 1722 to again search for a candidate host in the source pool according to the relaxed constraints. Otherwise, the method may go to element 1734 to select a best candidate host from among the evaluated hosts to be rebuilt at 1740; for example, a candidate host may be selected for which the evaluation determined that the host can be rebuilt in the least amount of time, even though the rebuild may take longer than the indicated time constraint provided by the pool monitoring process.

FIG. 12C is a flowchart of an alternative method for selecting hosts to be reconfigured and moved to another pool, according to some embodiments. The method of FIG. 12C may, for example, be performed at element 1720 of FIG. 12A. In this method, instead of evaluating hosts to determine whether rebuild strategies for the hosts can be executed within time and risk constraints, a rebuild strategy is determined, and one or more that can be rebuilt according to the rebuild strategy are selected. As indicated at 1752, a rebuild strategy that meets time constraints and risk constraints is determined. As indicated at 1754, a candidate host from the source pool is selected. As indicated at 1756, host status information for the candidate host is evaluated to determine if the candidate host can be rebuilt according to the rebuild strategy. At 1758, if the candidate host can be rebuilt according to the rebuild strategy, then the method may proceed to element 1740 of FIG. 12A to rebuild the host according to the rebuild strategy. Otherwise, the method goes to element 1760. At 1760, if there are more hosts in the source pool that can be evaluated as candidates for rebuilding, then the method returns to element 1752 to select and evaluate another candidate host. Otherwise, the method may go to element 1762 to select a best candidate host from among the evaluated hosts to be rebuilt at 1740; for example, a candidate host may be selected for which the evaluation determined that the host can be rebuilt according to the rebuild strategy with the least amount of additional risk.

Note that the pool monitoring process may request that more than one host be added to the target pool, or may request some number of slots that would require more than one host to be added to the target pool. In this case, the method of FIG. 12B or 12C may be performed to select the number of hosts that are needed in the target pool.

FIG. 13 is a flowchart of a method of applying various rebuild strategies on a host, according to some embodiments. FIG. 13 assumes that the different slot types are different sizes of slots (e.g., small, medium, and large slots) in terms of the amount of host resources (e.g., memory, storage, processors, etc.) that the slots provide for executing VMs. FIG. 13 also assumes that there are four basic rebuild strategies in order from the quickest to the slowest: resize, no reboot; resize, reboot; resize, reboot with updates; and full rebuild. However, note that there may be other rebuild strategies. For example, referring to FIG. 8, other rebuild strategies may include other combinations in which some of the steps are performed and other steps are skipped, for example a rebuild strategy in which only hardware vetting is skipped.

As indicated 1800, a rebuild agent on a host (or alternatively a host rebuild process executing on a device external to the host) receives and validates a rebuild strategy that was determined by a pool management service as described herein. At 1810, depending on the rebuild type, the agent executes a rebuild procedure for the host. If the rebuild type is resize, no reboot, then as indicated at 1820 the rebuild procedure resizes the host's slots, but does not reboot the host. If the rebuild type is resize, reboot, then as indicated at 1830 the rebuild procedure resizes the host's slots and reboots the host. If the rebuild type is resize, reboot with updates, then as indicated at 1840 the rebuild procedure resizes the host's slots, applies the necessary updates to software and/or firmware of the host, and reboots the host. If the rebuild type is full rebuild, then as indicated at 1850 a full rebuild procedure, for example as shown in FIG. 6, is performed on the host that vets the host hardware, cleans (wipe/repartition) the host's disk(s), does a clean software install, installs updates, and reboots the host.

Figure 14:
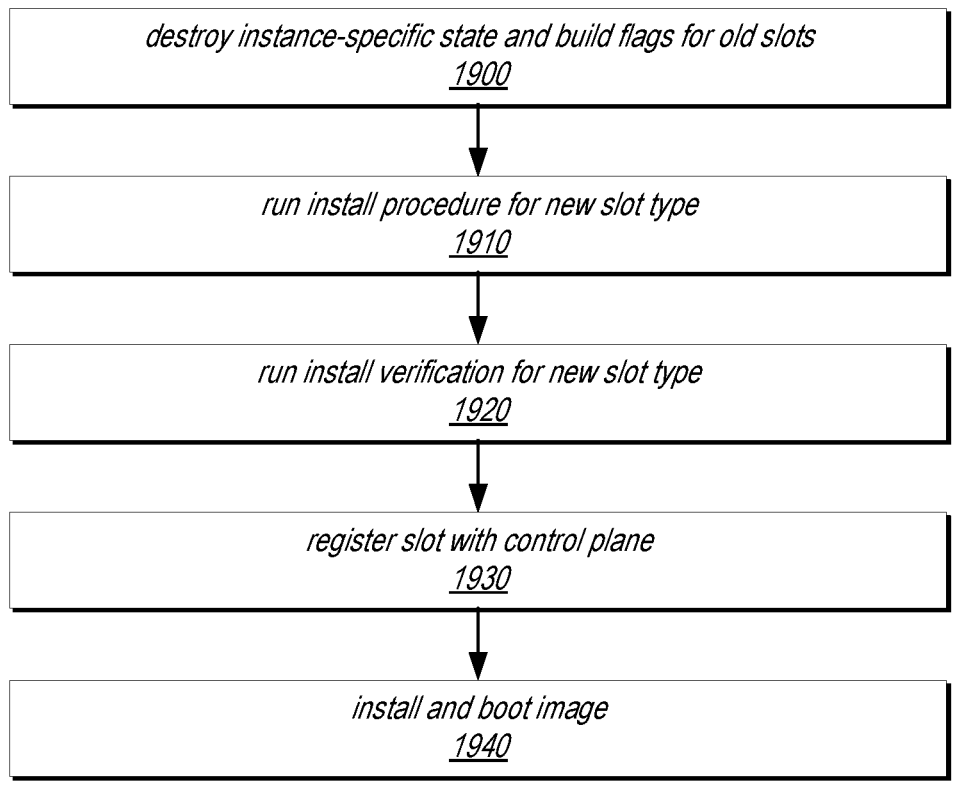
FIG. 14 is a flowchart of a method for resizing slots on a host, according to some embodiments.

FIG. 14 is a flowchart of a method for resizing slots on a host, according to some embodiments. The method of FIG. 14 may, for example, be performed at any of elements 1820 through 1850 of FIG. 13. As indicated at 1900, instance-specific state and build flags for the old slots may be destroyed. As indicated at 1920, an install procedure may be run for the new slot type (e.g., a particular slot size). As indicated at 1920, an install verification may be executed for the new slot type. As indicated at 1930, after the verification, the new slots may registered with the control plane. After the new slots are registered with the control plane, the new slots are available to be configured as instances in the clients' private network implementations on the provider network. As indicated at 1940, to configure an available slot as an instance, in some embodiments, the control plane maps a machine image of a VM into the slot; the slot is then booted with that image.

Example Provider Network Environment

This section describes example provider network environments in which embodiments of the methods and apparatus described in reference to FIGS. 1 through 14 may be implemented. However, these example provider network environments are not intended to be limiting.

Figure 15:
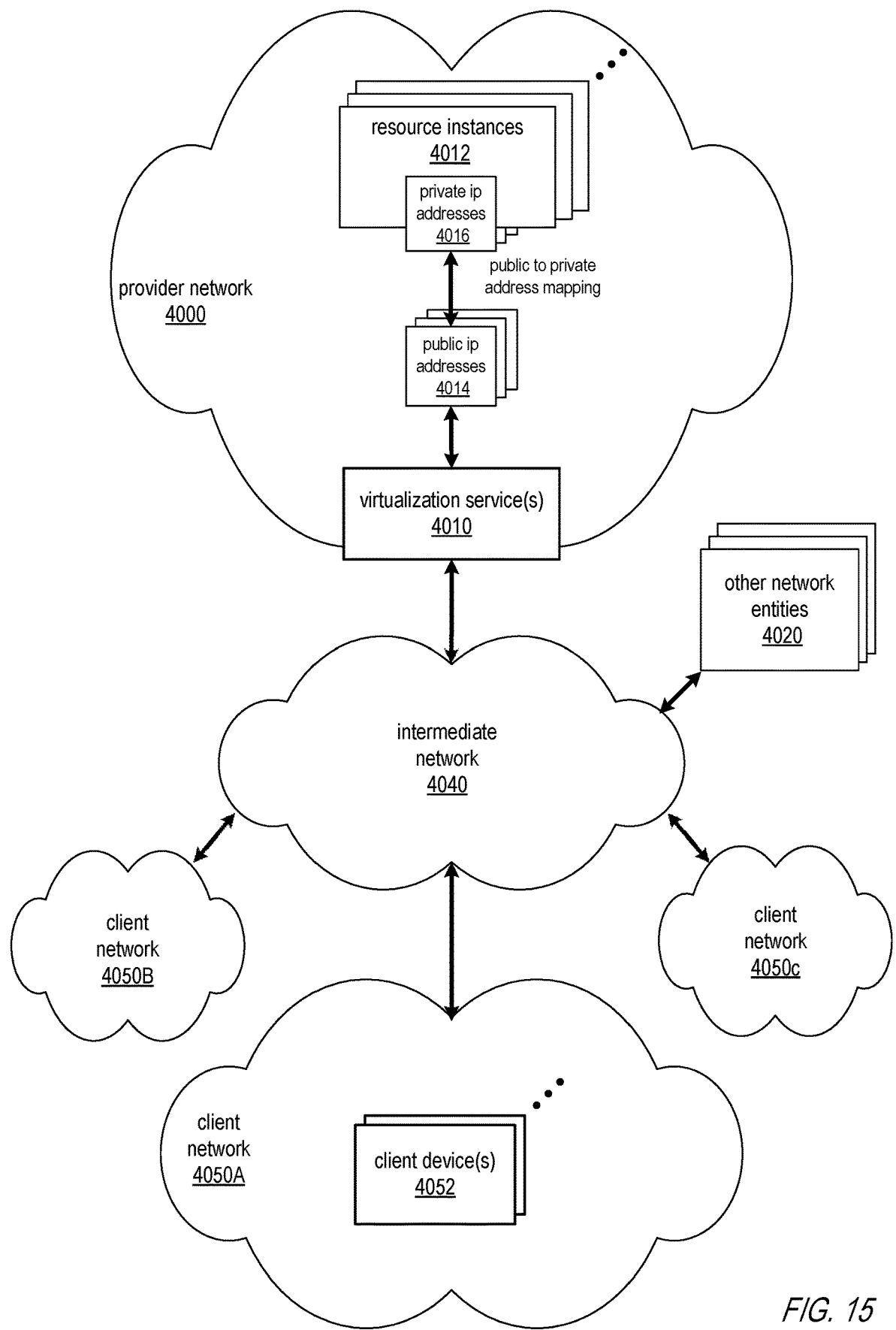
FIG. 15 illustrates an example provider network environment, according to some embodiments.

FIG. 15 illustrates an example provider network environment, according to some embodiments. A provider network 4000 may provide resource virtualization to clients via one or more virtualization services 4010 that allow clients to purchase, rent, or otherwise obtain instances 4012 of virtualized resources, including but not limited to computation and storage resources, implemented on devices within the provider network or networks in one or more data centers. Private IP addresses 4016 may be associated with the resource instances 4012; the private IP addresses are the internal network addresses of the resource instances 4012 on the provider network 4000. In some embodiments, the provider network 4000 may also provide public IP addresses 4014 and/or public IP address ranges (e.g., Internet Protocol version 4 (IPv4) or Internet Protocol version 6 (IPv6) addresses) that clients may obtain from the provider 4000.

Conventionally, the provider network 4000, via the virtualization services 4010, may allow a client of the service provider (e.g., a client that operates client network 4050A) to dynamically associate at least some public IP addresses 4014 assigned or allocated to the client with particular resource instances 4012 assigned to the client. The provider network 4000 may also allow the client to remap a public IP address 4014, previously mapped to one virtualized computing resource instance 4012 allocated to the client, to another virtualized computing resource instance 4012 that is also allocated to the client. Using the virtualized computing resource instances 4012 and public IP addresses 4014 provided by the service provider, a client of the service provider such as the operator of client network 4050A may, for example, implement client-specific applications and present the client's applications on an intermediate network 4040, such as the Internet. Other network entities 4020 on the intermediate network 4040 may then generate traffic to a destination public IP address 4014 published by the client network 4050A; the traffic is routed to the service provider data center, and at the data center is routed, via a network substrate, to the private IP address 4016 of the virtualized computing resource instance 4012 currently mapped to the destination public IP address 4014. Similarly, response traffic from the virtualized computing resource instance 4012 may be routed via the network substrate back onto the intermediate network 4040 to the source entity 4020.

Private IP addresses, as used herein, refer to the internal network addresses of resource instances in a provider network. Private IP addresses are only routable within the provider network. Network traffic originating outside the provider network is not directly routed to private IP addresses; instead, the traffic uses public IP addresses that are mapped to the resource instances. The provider network may include networking devices or appliances that provide network address translation (NAT) or similar functionality to perform the mapping from public IP addresses to private IP addresses and vice versa.

Public IP addresses, as used herein, are Internet routable network addresses that are assigned to resource instances, either by the service provider or by the client. Traffic routed to a public IP address is translated, for example via 1:1 network address translation (NAT), and forwarded to the respective private IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a private IP address of a resource instance is the default launch configuration for all resource instance types.

At least some public IP addresses may be allocated to or obtained by clients of the provider network 4000; a client may then assign their allocated public IP addresses to particular resource instances allocated to the client. These public IP addresses may be referred to as client public IP addresses, or simply client IP addresses. Instead of being assigned by the provider network 4000 to resource instances as in the case of standard IP addresses, client IP addresses may be assigned to resource instances by the clients, for example via an API provided by the service provider. Unlike standard IP addresses, client IP Addresses are allocated to client accounts and can be remapped to other resource instances by the respective clients as necessary or desired. A client IP address is associated with a client's account, not a particular resource instance, and the client controls that IP address until the client chooses to release it. Unlike conventional static IP addresses, client IP addresses allow the client to mask resource instance or availability zone failures by remapping the client's public IP addresses to any resource instance associated with the client's account. The client IP addresses, for example, enable a client to engineer around problems with the client's resource instances or software by remapping client IP addresses to replacement resource instances.

Figure 16:
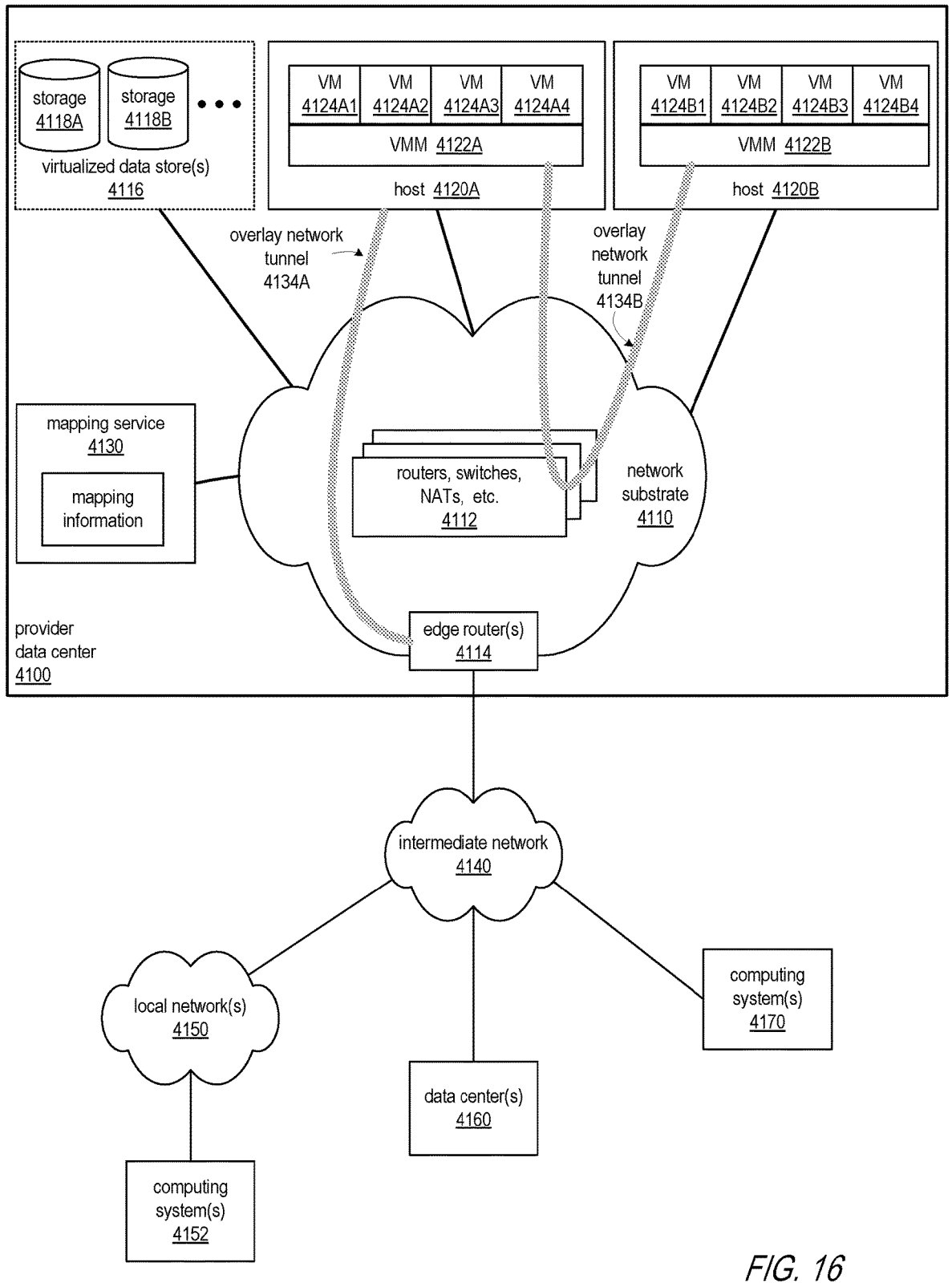
FIG. 16 illustrates an example data center that implements an overlay network on a network substrate using IP tunneling technology, according to some embodiments.

FIG. 16 illustrates an example data center that implements an overlay network on a network substrate using IP tunneling technology, according to some embodiments. A provider data center 4100 may include a network substrate that includes networking devices 4112 such as routers, switches, network address translators (NATs), and so on. Some embodiments may employ an Internet Protocol (IP) tunneling technology to provide an overlay network via which encapsulated packets may be passed through network substrate 4110 using tunnels. The IP tunneling technology may provide a mapping and encapsulating system for creating an overlay network on a network (e.g., a local network in data center 4100 of FIG. 16) and may provide a separate namespace for the overlay layer (the public IP addresses) and the network substrate 4110 layer (the private IP addresses). Packets in the overlay layer may be checked against a mapping directory (e.g., provided by mapping service 4130) to determine what their tunnel substrate target (private IP address) should be. The IP tunneling technology provides a virtual network topology (the overlay network); the interfaces (e.g., service APIs) that are presented to clients are attached to the overlay network so that when a client provides an IP address to which the client wants to send packets, the IP address is run in virtual space by communicating with a mapping service (e.g., mapping service 4130) that knows where the IP overlay addresses are.

In some embodiments, the IP tunneling technology may map IP overlay addresses (public IP addresses) to substrate IP addresses (private IP addresses), encapsulate the packets in a tunnel between the two namespaces, and deliver the packet to the correct endpoint via the tunnel, where the encapsulation is stripped from the packet. In FIG. 16, an example overlay network tunnel 4134A from a virtual machine (VM) 4124A on host 4120A to a device on the intermediate network 4150 and an example overlay network tunnel 4134B between a VM 4124B on host 4120B and a VM 4124C on host 4120C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (private IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the private IP addresses.

Referring to FIG. 16, at least some networks in which embodiments may be implemented may include hardware virtualization technology that enables multiple operating systems to run concurrently on a host computer (e.g., hosts 4120A and 4120B of FIG. 16), i.e. as virtual machines (VMs) 4124 on the hosts 4120. The VMs 4124 may, for example, be executed in slots on the hosts 4120 that are rented or leased to clients of a network provider. A hypervisor, or virtual machine monitor (VMM) 4122, on a host 4120 presents the VMs 4124 on the host with a virtual platform and monitors the execution of the VMs 4124. Each VM 4124 may be provided with one or more private IP addresses; the VMM 4122 on a host 4120 may be aware of the private IP addresses of the VMs 4124 on the host. A mapping service 4130 may be aware of all network IP prefixes and the IP addresses of routers or other devices serving IP addresses on the local network. This includes the IP addresses of the VMMs 4122 serving multiple VMs 4124. The mapping service 4130 may be centralized, for example on a server system, or alternatively may be distributed among two or more server systems or other devices on the network. A network may, for example, use the mapping service technology and IP tunneling technology to, for example, route data packets between VMs 4124 on different hosts 4120 within the data center 4100 network; note that an interior gateway protocol (IGP) may be used to exchange routing information within such a local network.

In addition, a network such as the provider data center 4100 network (which is sometimes referred to as an autonomous system (AS)) may use the mapping service technology, IP tunneling technology, and routing service technology to route packets from the VMs 4124 to Internet destinations, and from Internet sources to the VMs 4124. Note that an external gateway protocol (EGP) or border gateway protocol (BGP) is typically used for Internet routing between sources and destinations on the Internet. FIG. 16 shows an example provider data center 4100 implementing a network that provides resource virtualization technology and that provides full Internet access via edge router(s) 4114 that connect to Internet transit providers, according to some embodiments. The provider data center 4100 may, for example, provide clients the ability to implement virtual computing systems (VMs 4124) via a hardware virtualization service and the ability to implement virtualized data stores 4116 on storage resources 4118 via a storage virtualization service.

The data center 4100 network may implement IP tunneling technology, mapping service technology, and a routing service technology to route traffic to and from virtualized resources, for example to route packets from the VMs 4124 on hosts 4120 in data center 4100 to Internet destinations, and from Internet sources to the VMs 4124. Internet sources and destinations may, for example, include computing systems 4170 connected to the intermediate network 4140 and computing systems 4152 connected to local networks 4150 that connect to the intermediate network 4140 (e.g., via edge router(s) 4114 that connect the network 4150 to Internet transit providers). The provider data center 4100 network may also route packets between resources in data center 4100, for example from a VM 4124 on a host 4120 in data center 4100 to other VMs 4124 on the same host or on other hosts 4120 in data center 4100.

A service provider that provides data center 4100 may also provide additional data center(s) 4160 that include hardware virtualization technology similar to data center 4100 and that may also be connected to intermediate network 4140. Packets may be forwarded from data center 4100 to other data centers 4160, for example from a VM 4124 on a host 4120 in data center 4100 to another VM on another host in another, similar data center 4160, and vice versa.

While the above describes hardware virtualization technology that enables multiple operating systems to run concurrently on host computers as virtual machines (VMs) on the hosts, where the VMs may be instantiated on slots on hosts that are rented or leased to clients of the network provider, the hardware virtualization technology may also be used to provide other computing resources, for example storage resources 4118, as virtualized resources to clients of a network provider in a similar manner.

Figure 17:
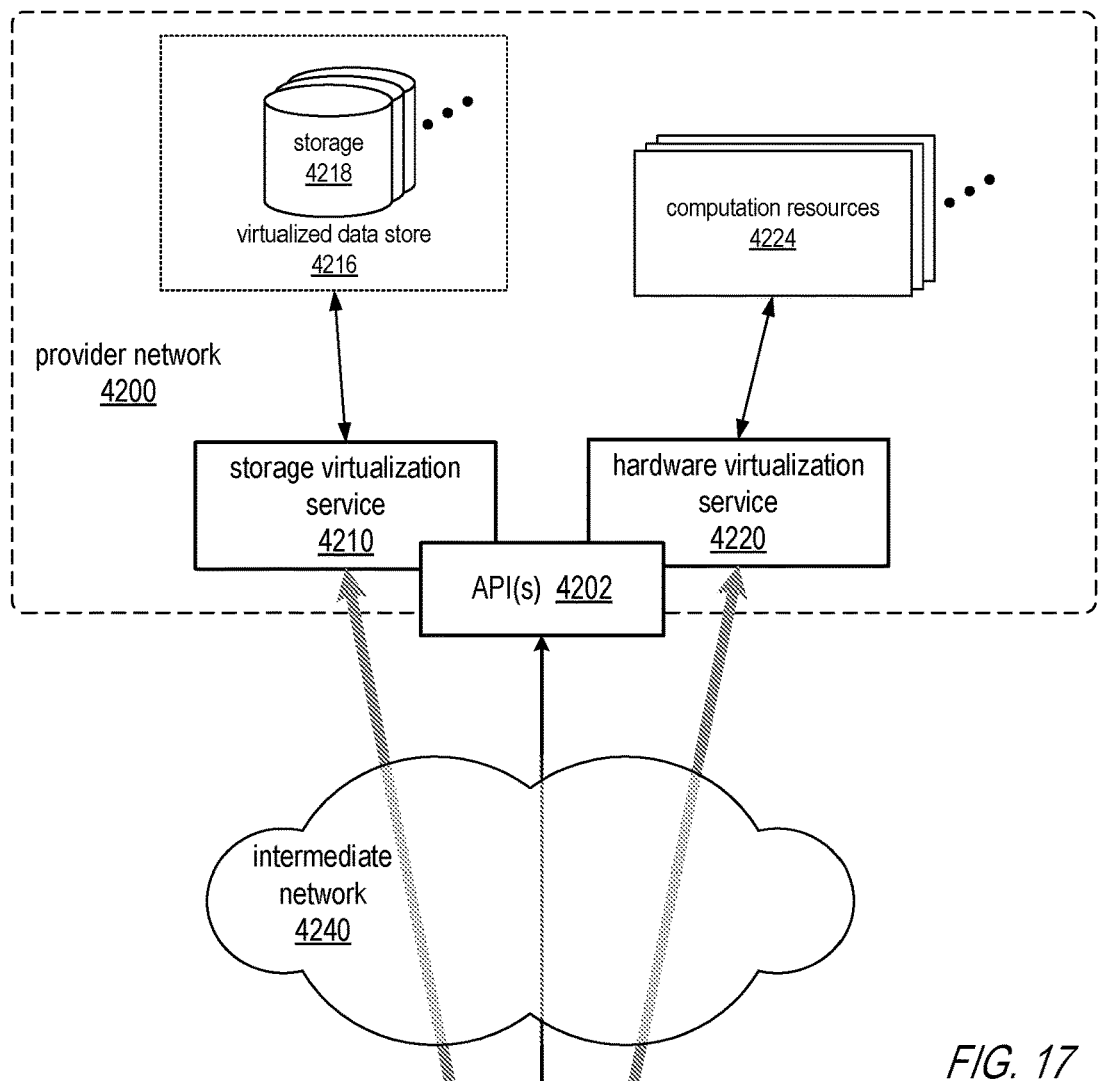
FIG. 17 is a block diagram of an example provider network that provides a storage virtualization service and a hardware virtualization service to clients, according to some embodiments.
Figure 17:
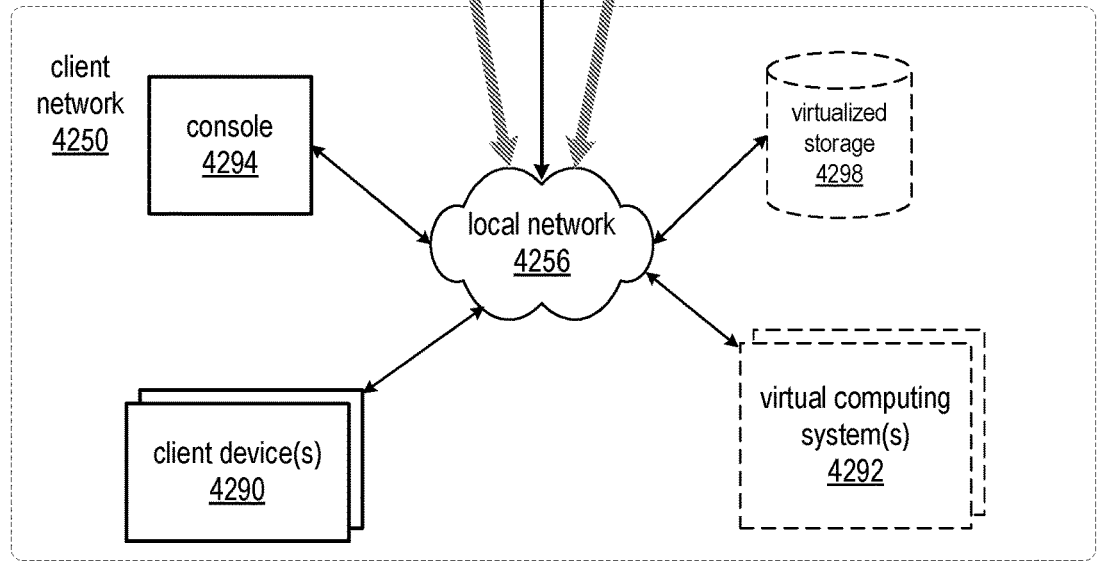

FIG. 17 is a block diagram of an example provider network that provides a storage virtualization service and a hardware virtualization service to clients, according to some embodiments. Hardware virtualization service 4220 provides multiple computation resources 4224 (e.g., VMs) to clients. The computation resources 4224 may, for example, be rented or leased to clients of the provider network 4200 (e.g., to a client that implements client network 4250). Each computation resource 4224 may be provided with one or more private IP addresses. Provider network 4200 may be configured to route packets from the private IP addresses of the computation resources 4224 to public Internet destinations, and from public Internet sources to the computation resources 4224.

Provider network 4200 may provide a client network 4250, for example coupled to intermediate network 4240 via local network 4256, the ability to implement virtual computing systems 4292 via hardware virtualization service 4220 coupled to intermediate network 4240 and to provider network 4200. In some embodiments, hardware virtualization service 4220 may provide one or more APIs 4202, for example a web services interface, via which a client network 4250 may access functionality provided by the hardware virtualization service 4220, for example via a console 4294. In some embodiments, at the provider network 4200, each virtual computing system 4292 at client network 4250 may correspond to a computation resource 4224 that is leased, rented, or otherwise provided to client network 4250.

From an instance of a virtual computing system 4292 and/or another client device 4290 or console 4294, the client may access the functionality of storage virtualization service 4210, for example via one or more APIs 4202, to access data from and store data to a virtual data store 4216 provided by the provider network 4200. In some embodiments, a virtualized data store gateway (not shown) may be provided at the client network 4250 that may locally cache at least some data, for example frequently accessed or critical data, and that may communicate with virtualized data store service 4210 via one or more communications channels to upload new or modified data from a local cache so that the primary store of data (virtualized data store 4216) is maintained. In some embodiments, a user, via a virtual computing system 4292 and/or on another client device 4290, may mount and access virtual data store 4216 volumes, which appear to the user as local virtualized storage 4298.

While not shown in FIG. 17, the virtualization service(s) may also be accessed from resource instances within the provider network 4200 via API(s) 4202. For example, a client, appliance service provider, or other entity may access a virtualization service from within a respective virtual network on the provider network 4200 via an API 4202 to request allocation of one or more resource instances within the virtual network or within another virtual network.

Figure 18:
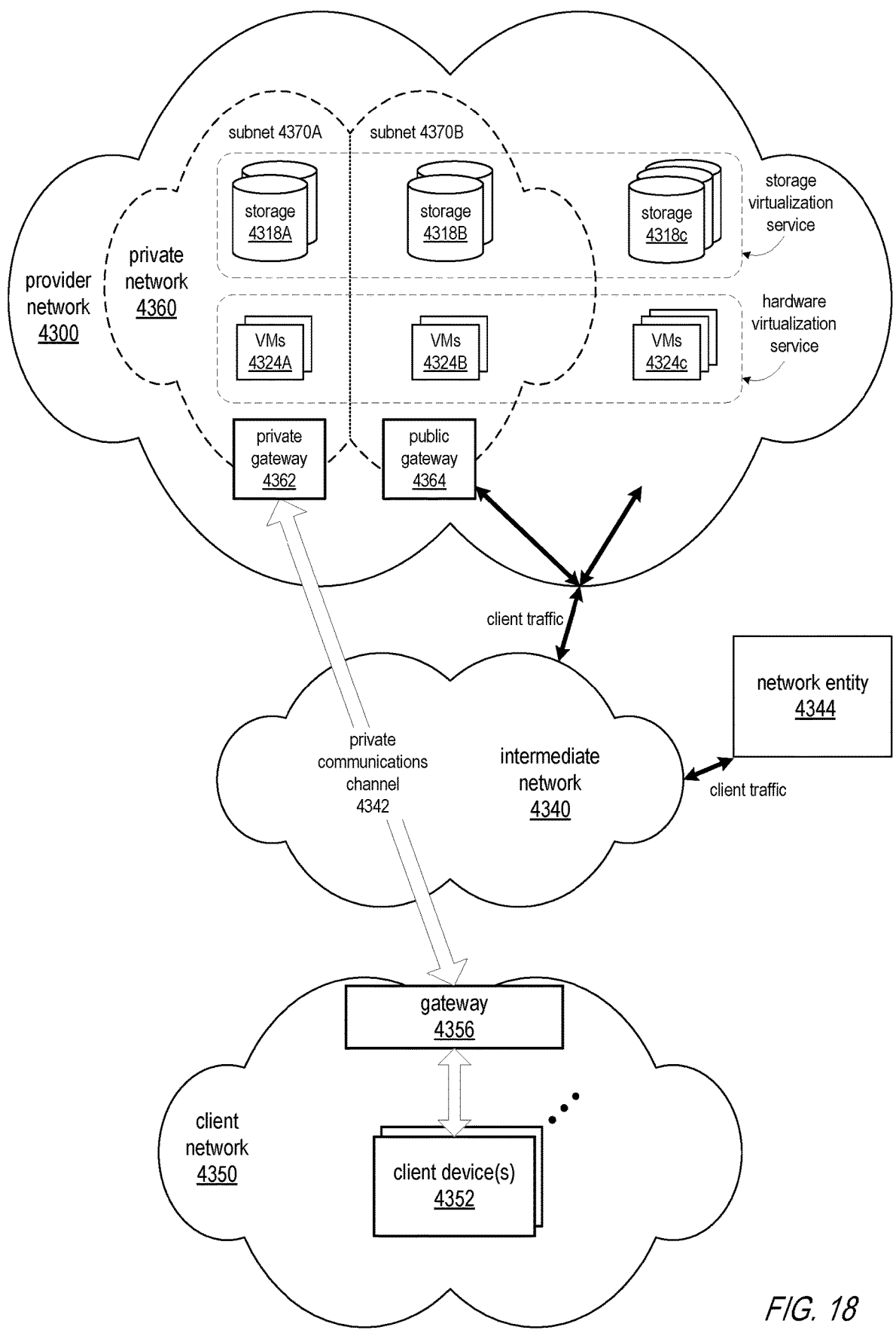
FIG. 18 illustrates an example provider network that provides virtual networks to at least some clients, according to some embodiments.

FIG. 18 illustrates an example provider network that provides virtual networks on the provider network to at least some clients, according to some embodiments. A client's virtual network 4360 on a provider network 4300, for example, enables a client to connect their existing infrastructure (e.g., devices 4352) on client network 4350 to a set of logically isolated resource instances (e.g., VMs 4324A and 4324B and storage 4318A and 4318B), and to extend management capabilities such as security services, firewalls, and intrusion detection systems to include their resource instances.

A client's virtual network 4360 may be connected to a client network 4350 via a private communications channel 4342. A private communications channel 4342 may, for example, be a tunnel implemented according to a network tunneling technology or some other technology over an intermediate network 4340. The intermediate network may, for example, be a shared network or a public network such as the Internet. Alternatively, a private communications channel 4342 may be implemented over a direct, dedicated connection between virtual network 4360 and client network 4350.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a client network.

To establish a virtual network 4360 for a client on provider network 4300, one or more resource instances (e.g., VMs 4324A and 4324B and storage 4318A and 4318B) may be allocated to the virtual network 4360. Note that other resource instances (e.g., storage 4318C and VMs 4324C) may remain available on the provider network 4300 for other client usage. A range of public IP addresses may also be allocated to the virtual network 4360. In addition, one or more networking devices (routers, switches, etc.) of the provider network 4300 may be allocated to the virtual network 4360. A private communications channel 4342 may be established between a private gateway 4362 at virtual network 4360 and a gateway 4356 at client network 4350.

In some embodiments, in addition to, or instead of, a private gateway 4362, virtual network 4360 may include a public gateway 4364 that enables resources within virtual network 4360 to communicate directly with entities (e.g., network entity 4344) via intermediate network 4340, and vice versa, instead of or in addition to via private communications channel 4342.

Virtual network 4360 may be, but is not necessarily, subdivided into two or more subnetworks, or subnets, 4370. For example, in implementations that include both a private gateway 4362 and a public gateway 4364, a virtual network 4360 may be subdivided into a subnet 4370A that includes resources (VMs 4324A and storage 4318A, in this example) reachable through private gateway 4362, and a subnet 4370B that includes resources (VMs 4324B and storage 4318B, in this example) reachable through public gateway 4364.

The client may assign particular client public IP addresses to particular resource instances in virtual network 4360. A network entity 4344 on intermediate network 4340 may then send traffic to a public IP address published by the client; the traffic is routed, by the provider network 4300, to the associated resource instance. Return traffic from the resource instance is routed, by the provider network 4300, back to the network entity 4344 over intermediate network 4340. Note that routing traffic between a resource instance and a network entity 4344 may require network address translation to translate between the public IP address and the private IP address of the resource instance.

Some embodiments may allow a client to remap public IP addresses in a client's virtual network 4360 as illustrated in FIG. 18 to devices on the client's external network 4350. When a packet is received (e.g., from network entity 4344), the network 4300 may determine that the destination IP address indicated by the packet has been remapped to an endpoint on external network 4350 and handle routing of the packet to the respective endpoint, either via private communications channel 4342 or via the intermediate network 4340. Response traffic may be routed from the endpoint to the network entity 4344 through the provider network 4300, or alternatively may be directly routed to the network entity 4344 by the client network 4350. From the perspective of the network entity 4344, it appears as if the network entity 4344 is communicating with the public IP address of the client on the provider network 4300. However, the network entity 4344 has actually communicated with the endpoint on client network 4350.

While FIG. 18 shows network entity 4344 on intermediate network 4340 and external to provider network 4300, a network entity may be an entity on provider network 4300. For example, one of the resource instances provided by provider network 4300 may be a network entity that sends traffic to a public IP address published by the client.

Illustrative System

In some embodiments, a system that implements a portion or all of the methods and apparatus for reconfiguring host devices in provider network environments as described herein may include a general-purpose computer system that includes or is configured to access one or more computer-accessible media, such as computer system 5000 illustrated in FIG. 19. In the illustrated embodiment, computer system 5000 includes one or more processors 5010 coupled to a system memory 5020 via an input/output (I/O) interface 5030. Computer system 5000 further includes a network interface 5040 coupled to I/O interface 5030. While FIG. 19 shows computer system 5000 as a single computing device, in various embodiments a computer system 5000 may include one computing device or any number of computing devices configured to work together as a single computer system 5000.

In various embodiments, computer system 5000 may be a uniprocessor system including one processor 5010, or a multiprocessor system including several processors 5010 (e.g., two, four, eight, or another suitable number). Processors 5010 may be any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for providing client-defined rules for clients' resources in provider network environments, are shown stored within system memory 5020 as code 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computer system 5000 and other devices 5060 attached to a network or networks 5050, such as other computer systems or devices as illustrated in FIGS. 1 through 18, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-accessible medium configured to store program instructions and data as described above for FIGS. 1 through 14 for reconfiguring host devices in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 5000 via I/O interface 5030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computer system 5000 as system memory 5020 or another type of memory. Further, a computer-accessible medium may include transmission media or signals such as electrical, electromagnetic, or digital signals, conveyed via a communication medium such as a network and/or a wireless link, such as may be implemented via network interface 5040.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
  a processor coupled to a memory, the memory including instructions that upon execution cause the system to:
    maintain two or more logical pools of host devices with available slots on a provider network, each pool including host devices that implement slots of a respective one of two or more slot types;
    monitor demand for the two or more types of slots maintained in the respective pools and a number of available slots on the host devices in the respective pools;
    upon determining that demand is high for slots of a particular slot type in a respective pool or that the number of available slots of the particular slot type in the respective pool is below a threshold:
      select one or more host devices from another pool that includes host devices that implement slots of another slot type to be moved to the pool that includes host devices that implement slots of the particular slot type; and
      cause respective rebuild strategies to be executed for the selected host devices, wherein the rebuild strategy for a selected host device when executed reconfigures the selected host device to implement slots of the particular slot type; and
      wherein the rebuild strategy for at least one of the selected host devices when executed does not perform at least one of a plurality of steps in a full rebuild procedure for the selected host device.

2. The system as recited in claim 1, wherein, to select one or more host devices from another pool that includes host devices that implement slots of another slot type to be moved to the pool that includes host devices that implement slots of the particular slot type, the instructions upon execution cause the system to:
- select a host device from the pool of host devices that implements slots of the other type as a candidate host device;
- evaluate a respective rebuild strategy for the candidate host device to determine if the candidate host device can be rebuilt within a time constraint for providing the additional slots of the particular slot type and with an acceptable level of risk according to one or more risk constraints;
- if the candidate host device can be rebuilt within the time constraint and with the acceptable level of risk, select the candidate host device to be reconfigured to implement slots of the particular type; and
- if the candidate host device cannot be rebuilt within the time constraint and with the acceptable level of risk, select and evaluate another host device from the pool of host devices that implement slots of the other type as a candidate host device.

3. The system as recited in claim 1, wherein, to select one or more host devices from another pool that includes host devices that implement slots of another slot type to be moved to the pool that includes host devices that implement slots of the particular slot type, the instructions upon execution cause the system to:
- determine a rebuild strategy for a host device that satisfies a time constraint and a risk constraint for reconfiguring the host device to implement slots of the particular type;
- select a host device from the pool of host devices that implements slots of the other type as a candidate host device;
- evaluate host status information for the candidate host device to determine if the candidate host device can be rebuilt according to the determined rebuild strategy;
- if the candidate host device can be rebuilt according to the determined rebuild strategy, select the candidate host device to be reconfigured to implement slots of the particular type according to the determined rebuild strategy; and
- if the candidate host device cannot be rebuilt according to the determined rebuild strategy, select and evaluate another host device from the pool as a candidate host device.

4. The system as recited in claim 1, wherein the instructions upon execution further cause the system to determine the rebuild strategies for reconfiguring the host devices, and wherein, to determine a rebuild strategy for reconfiguring a host device, the instructions upon execution cause the system to:
- evaluate information about hardware components of the host device to determine if a hardware vetting step of the full rebuild procedure can be skipped for the host device;
- evaluate information about one or more disks of the host device to determine if a disk cleaning step of the full rebuild procedure can be skipped for the host device;
- evaluate information about software on the host device to determine if a software install step of the full rebuild procedure can be skipped for the host device;
- evaluate the information about the software on the host device to determine if a software update step of the full rebuild procedure to update installed software for the host device can be skipped for the host device; and
- determine if a reboot step of the full rebuild procedure can be skipped, wherein the reboot step of the full rebuild procedure can be skipped if other steps that are to be performed when reconfiguring the host device do not require that the host device be rebooted.

5. The system as recited in claim 1, wherein the memory further includes instructions that upon execution cause the system to monitor results of previous executions of rebuild strategies on host devices of the provider network, wherein, to determine a rebuild strategy for reconfiguring a host device, the instructions upon execution further cause the system to evaluate the results of previous executions of rebuild strategies on the host devices of the provider network to determine if one or more of the steps of the full rebuild procedure can be skipped or should be performed.

6. The system as recited in claim 1, wherein the two or more slots types include two or more different sizes of slots in terms of an amount of host device resources allocated to the slots, wherein smaller slots are allocated smaller amounts of host device resources than are larger slots.

7. A method, comprising:
performing, by one or more devices on a provider network:
- monitoring demand for two or more types of slots maintained in two or more logical pools of host devices with available slots on the provider network and a number of available slots on the host devices in the respective pools, each pool including host devices that implement slots of a respective one of the two or more slot types;
- determining that additional slots of a particular one of the two or more slot types are needed in a respective one of the two or more pools;
- selecting one or more host devices from another pool that includes host devices that implement slots of another slot type to be moved to the pool that includes host devices that implement slots of the particular slot type; and
- reconfiguring the selected host devices according to respective rebuild strategies to implement slots of the particular type, wherein, in said reconfiguring at least one of the selected host devices, at least one of a plurality of steps in a full rebuild procedure for host devices is not performed for the selected host device.

8. The method as recited in claim 7, wherein selecting one or more host devices from another pool that includes host devices that implement slots of another slot type to be moved to the pool that includes host devices that implement slots of the particular slot type comprises:
- selecting a host device from the pool of host devices that implements slots of the other type as a candidate host device;
- evaluating a respective rebuild strategy for the candidate host device to determine if the candidate host device can be rebuilt within a time constraint for providing the additional slots of the particular slot type and with an acceptable level of risk according to one or more risk constraints;
- if the candidate host device can be rebuilt within the time constraint and with the acceptable level of risk, selecting the candidate host device to be reconfigured to implement slots of the particular type; and
- if the candidate host device cannot be rebuilt within the time constraint and with the acceptable level of risk, selecting and evaluating another host device from the pool of host devices that implement slots of the other type as a candidate host device.

9. The method as recited in claim 7, wherein selecting one or more host devices from another pool that includes host devices that implement slots of another slot type to be moved to the pool that includes host devices that implement slots of the particular slot type comprises:
    determining a rebuild strategy for a host device that satisfies a time constraint and a risk constraint for reconfiguring the host device to implement slots of the particular type;
    selecting a host device from the pool of host devices that implements slots of the other type as a candidate host device;
    evaluating the host status information for the candidate host device to determine if the candidate host device can be rebuilt according to the determined rebuild strategy;
    if the candidate host device can be rebuilt according to the determined rebuild strategy, selecting the candidate host device to be reconfigured to implement slots of the particular type according to the determined rebuild strategy; and
    if the candidate host device cannot be rebuilt according to the determined rebuild strategy, selecting and evaluating another host device from the pool of host devices that implement slots of the other type as a candidate host device.

10. The method as recited in claim 7, further comprising determining the rebuild strategies for reconfiguring the host devices based at least in part on host status information for the host devices, wherein determining a rebuild strategy for reconfiguring a host device comprises:
    determining if a vetting step of the full rebuild procedure to test hardware components of the selected host device can be skipped;
    determining if a disk cleaning step of the full rebuild procedure to wipe data from and repartition one or more disks of the selected host device can be skipped;
    determining if a software install step of the full rebuild procedure to perform a clean install of software for the selected host device can be skipped;
    determining if a software update step of the full rebuild procedure to update installed software for the selected host device can be skipped; or
    determining if a reboot step of the full rebuild procedure can be skipped, wherein the reboot step of the full rebuild procedure can be skipped if the other steps that are to be performed when reconfiguring the host device do not require that the host device be rebooted.

11. The method as recited in claim 10, wherein the host status information includes one or more of:
    health information for the hardware components of the host device used in determining if the vetting step of the full rebuild procedure can be skipped;
    health information for the one or more disks of the host device used in determining if the disk cleaning step of the full rebuild procedure can be skipped;
    information about data currently stored on the one or more disks of the host device used in determining if the disk cleaning step of the full rebuild procedure can be skipped; or
    information about software on the host device used in determining if the software install step of the full rebuild procedure can be skipped and in determining if the software update step of the full rebuild procedure can be skipped.

12. The method as recited in claim 11, further comprising monitoring results of previous executions of rebuild strategies on host devices of the provider network, wherein, in said determining a rebuild strategy for reconfiguring a host device, the results of previous executions of rebuild strategies on the host devices of the provider network are used in determining if one or more of the steps of the full rebuild procedure can be skipped or should be performed.

13. The method as recited in claim 7, further comprising:
    determining a time constraint for when the additional slots of the particular slot type are needed based at least in part on the number of available slots on the host devices in the respective pool;
    determining an acceptable level of risk for not performing one or more steps of the full rebuild procedure when reconfiguring host devices to be moved to the pool that includes host devices that implement slots of the particular slot type based at least in part on the determined time constraint; and
    wherein selecting one or more host devices from another pool that includes host devices that implement slots of another slot type to be moved to the pool that includes host devices that implement slots of the particular slot type is performed based at least in part on the determined time constraint and determined acceptable level of risk.

14. The method as recited in claim 13, further comprising:
    increasing the time constraint and accepting a higher level of risk if the number of available slots on the host devices in the respective pool is below a threshold; and
    relaxing the time constraint and accepting a lower level of risk if the number of available slots on the host devices in the respective pool is above the threshold.

15. The method as recited in claim 7, further comprising maintaining pool management data including information about the host devices in the pools, wherein the information about the host devices in the pools includes one or more of a number of available slots on the host devices, hardware and software configurations for the host devices, clients to which the host devices or slots on the host devices are allocated, health information for the host devices, or usage information for resources on the host devices.

16. The method as recited in claim 7, wherein selecting one or more host devices from another pool that includes host devices that implement slots of another slot type to be moved to the pool that includes host devices that implement slots of the particular slot type comprises selecting the one or more host devices from the other pool based at least in part on the information about the host devices in the other pool maintained in the pool management data for the other pool.

17. The method as recited in claim 7, wherein the two or more slot types include two or more different sizes of slots in terms of an amount of host device resources allocated to the slots, wherein smaller slots are allocated smaller amounts of host device resources than are larger slots.

18. One or more non-transitory computer-readable storage media storing program instructions that when executed on or across one or more processors cause the one or more processors to:
    monitor demand for two or more types of slots maintained in two or more logical pools of host devices with available slots on the provider network and a number of available slots on the host devices in the respective pools, each pool including host devices that implement slots of a respective one of the two or more slot types;

determine that additional slots of a particular one of the two or more slot types are needed in a respective one of the two or more pools;

select one or more host devices from another pool that includes host devices that implement slots of another slot type to be moved to the pool that includes host devices that implement slots of the particular slot type; and reconfigure the selected host devices according to respective rebuild strategies to implement slots of the particular type, wherein, in said reconfiguring at least one of the selected host devices, at least one of a plurality of steps in a full rebuild procedure for host devices is not performed for the selected host device.

19. The one or more non-transitory computer-readable storage media as recited in claim 18, wherein, to select one or more host devices from another pool that includes host devices that implement slots of another slot type to be moved to the pool that includes host devices that implement slots of the particular slot type, the program instructions when executed on or across the one or more processors cause the one or more processors to:

select a host device from the pool of host devices that implements slots of the other type as a candidate host device;

evaluate a respective rebuild strategy for the candidate host device to determine if the candidate host device can be rebuilt within a time constraint for providing the additional slots of the particular slot type and with an acceptable level of risk according to one or more risk constraints;

if the candidate host device can be rebuilt within the time constraint and with the acceptable level of risk, select the candidate host device to be reconfigured to implement slots of the particular type; and if the candidate host device cannot be rebuilt within the time constraint and with the acceptable level of risk, select and evaluate another host device from the pool of host devices that implement slots of the other type as a candidate host device.

20. The one or more non-transitory computer-readable storage media as recited in claim 18, wherein, to select one or more host devices from another pool that includes host devices that implement slots of another slot type to be moved to the pool that includes host devices that implement slots of the particular slot type, the program instructions when executed on or across the one or more processors cause the one or more processors to:

determine a rebuild strategy for a host device that satisfies a time constraint and a risk constraint for reconfiguring the host device to implement slots of the particular type;

select a host device from the pool of host devices that implements slots of the other type as a candidate host device;

evaluate the host status information for the candidate host device to determine if the candidate host device can be rebuilt according to the determined rebuild strategy;

if the candidate host device can be rebuilt according to the determined rebuild strategy, select the candidate host device to be reconfigured to implement slots of the particular type according to the determined rebuild strategy; and if the candidate host device cannot be rebuilt according to the determined rebuild strategy, select and evaluate another host device from the pool of host devices that implement slots of the other type as a candidate host device.

\* \* \* \* \*